United States Patent
Ko et al.

(10) Patent No.: US 11,960,021 B2
(45) Date of Patent: Apr. 16, 2024

(54) SIDELINK POSITIONING BASED ON PRS TRANSMISSION OF SINGLE USER EQUIPMENT IN NR V2X

(71) Applicant: LG ELECTRONICS INC., Seoul (KR)

(72) Inventors: Woosuk Ko, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 315 days.

(21) Appl. No.: 17/596,152

(22) PCT Filed: Jun. 5, 2020

(86) PCT No.: PCT/KR2020/007313
§ 371 (c)(1),
(2) Date: Dec. 3, 2021

(87) PCT Pub. No.: WO2020/246842
PCT Pub. Date: Dec. 10, 2020

(65) Prior Publication Data
US 2022/0236365 A1    Jul. 28, 2022

(30) Foreign Application Priority Data

Jun. 5, 2019    (KR) .......................... 10-2019-0066888

(51) Int. Cl.
*G01S 5/06*    (2006.01)
*G01S 5/02*    (2010.01)
(Continued)

(52) U.S. Cl.
CPC .............. *G01S 5/06* (2013.01); *G01S 5/0236* (2013.01); *G01S 5/0244* (2020.05); *H04L 5/0048* (2013.01); *H04W 92/18* (2013.01)

(58) Field of Classification Search
CPC ........ G01S 5/06; G01S 5/0244; G01S 5/0236; H04L 5/0048; H04W 92/18
See application file for complete search history.

(56) References Cited

U.S. PATENT DOCUMENTS 9,713,117 B2    7/2017   Khoryaev et al.
2017/0142682 A1    5/2017   Gunnarsson et al.
(Continued)

OTHER PUBLICATIONS

PCT International Application No. PCT/KR2020/007313, International Search Report dated Aug. 31, 2020, 4 pages.
(Continued)

*Primary Examiner* — Adam D Houston
(74) *Attorney, Agent, or Firm* — LEE, HONG, DEGERMAN, KANG & WAIMEY

(57) ABSTRACT

A method for performing, by a first user equipment, wireless communication is proposed. The method may comprise the steps of: transmitting a positioning reference signal (PRS) to a plurality of second user equipments; receiving, from the plurality of second user equipments, location information of the plurality of second user equipments and time of arrival (TOA) values of the plurality of second user equipments; and determining a location of the first user equipment on the basis of the location information of the plurality of second user equipments and the TOA values of the plurality of second user equipments. For example, the TOA values may be determined on the basis of a time when the plurality of second user equipments receive the PRS.

15 Claims, 30 Drawing Sheets

(51) Int. Cl.
H04L 5/00 (2006.01)
H04W 92/18 (2009.01)

(56) References Cited

U.S. PATENT DOCUMENTS

| | | | | |
|---|---|---|---|---|
| 2018/0262867 | A1 | 9/2018 | Edge | |
| 2022/0109527 | A1* | 4/2022 | Hwang | H04L 1/1825 |
| 2022/0248375 | A1* | 8/2022 | Baek | H04W 72/56 |
| 2022/0248387 | A1* | 8/2022 | Park | H04W 4/40 |
| 2022/0337355 | A1* | 10/2022 | Do | H04L 1/1854 |
| 2022/0346000 | A1* | 10/2022 | Baek | H04L 5/0048 |
| 2022/0361069 | A1* | 11/2022 | Zhang | H04W 72/23 |
| 2022/0361137 | A1* | 11/2022 | Baek | H04L 5/0078 |
| 2022/0361142 | A1* | 11/2022 | Ko | H04W 28/26 |
| 2022/0365163 | A1* | 11/2022 | Baek | H04W 4/40 |
| 2022/0369417 | A1* | 11/2022 | Park | H04W 28/0268 |
| 2022/0385423 | A1* | 12/2022 | Ko | G01S 5/0072 |
| 2022/0386093 | A1* | 12/2022 | Baek | H04W 56/00 |
| 2022/0397633 | A1* | 12/2022 | Baek | H04W 72/20 |
| 2022/0407647 | A1* | 12/2022 | Baek | H04L 5/0053 |
| 2022/0416976 | A1* | 12/2022 | Baek | H04W 72/51 |
| 2022/0417854 | A1* | 12/2022 | Park | H04W 52/028 |
| 2023/0003827 | A1* | 1/2023 | Ko | G01S 5/0236 |
| 2023/0053304 | A1* | 2/2023 | Thomas | G01S 5/0236 |
| 2023/0062805 | A1* | 3/2023 | Baek | H04W 64/00 |
| 2023/0076030 | A1* | 3/2023 | Baek | H04W 24/10 |
| 2023/0101824 | A1* | 3/2023 | Baek | H04W 4/40 |
| | | | | 455/522 |
| 2023/0109359 | A1* | 4/2023 | Back | H04L 27/26 |
| | | | | 370/329 |
| 2023/0127945 | A1* | 4/2023 | Ko | G01S 5/0236 |
| | | | | 455/456.1 |
| 2023/0152420 | A1* | 5/2023 | Ko | H04W 64/00 |
| | | | | 455/456.1 |
| 2023/0221397 | A1* | 7/2023 | Baek | G01S 5/0063 |
| | | | | 455/456.1 |
| 2023/0319761 | A1* | 10/2023 | Baek | G01S 1/042 |
| | | | | 455/456.1 |
| 2023/0328582 | A1* | 10/2023 | Zhang | H04W 24/08 |
| | | | | 370/235 |
| 2023/0328686 | A1* | 10/2023 | Edge | H04W 64/00 |
| | | | | 455/456.1 |
| 2023/0337171 | A1* | 10/2023 | Baek | H04W 72/12 |
| 2023/0397150 | A1* | 12/2023 | Baek | H04W 4/40 |

OTHER PUBLICATIONS

CATT, "Discussion of Potential Techniques for NR Positioning," 3GPP TSG RAN WG1 Meeting #95, R1-1812615, Nov. 2018, 28 pages.

Huawei et al., "Considerations on NR Positioning," 3GPP TSG RAN WG1 #94, R1-1809348, Aug. 2018, 9 pages.

\* cited by examiner

FIG. 4
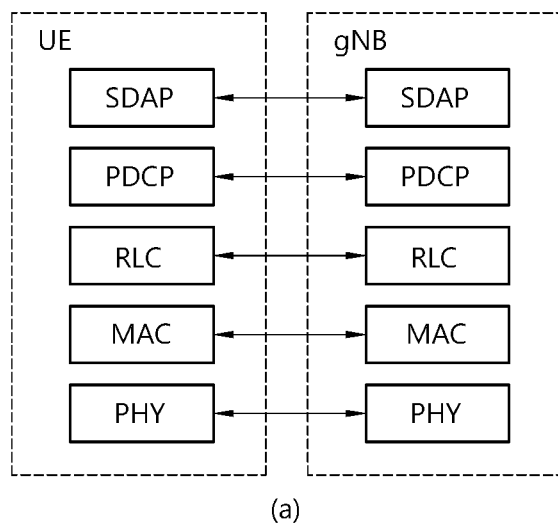
(a)
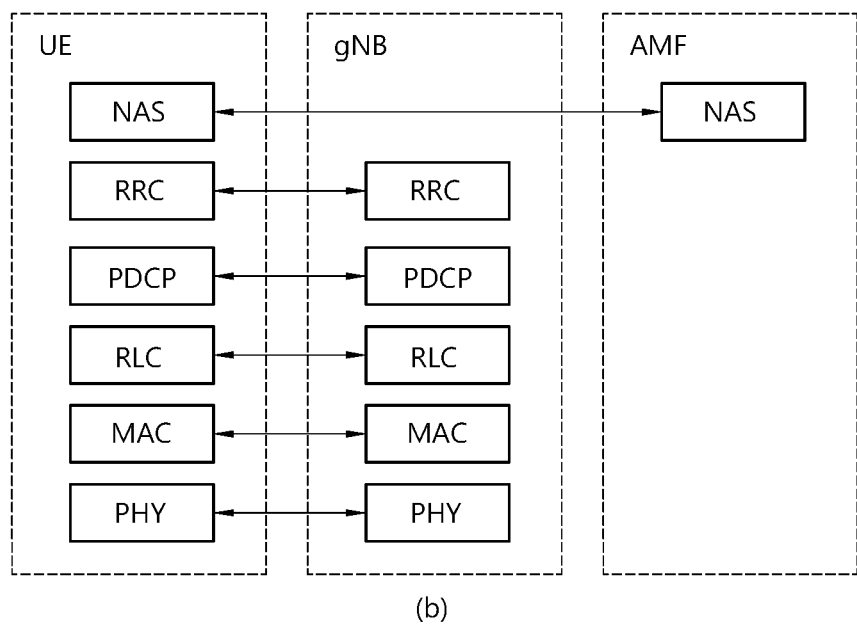
(b)

FIG. 8
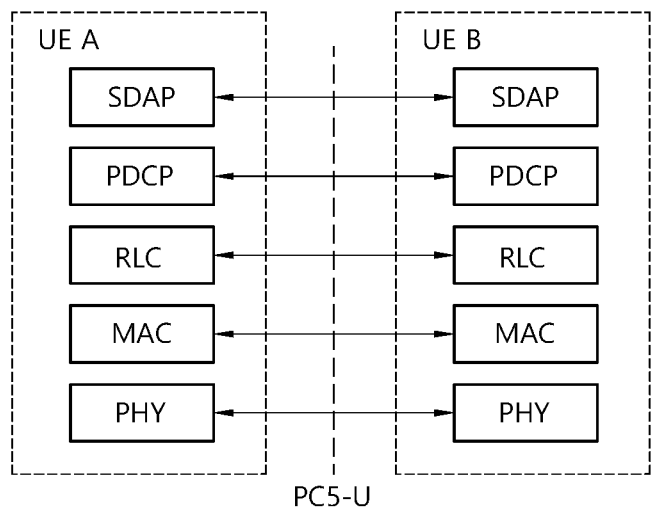
(a)
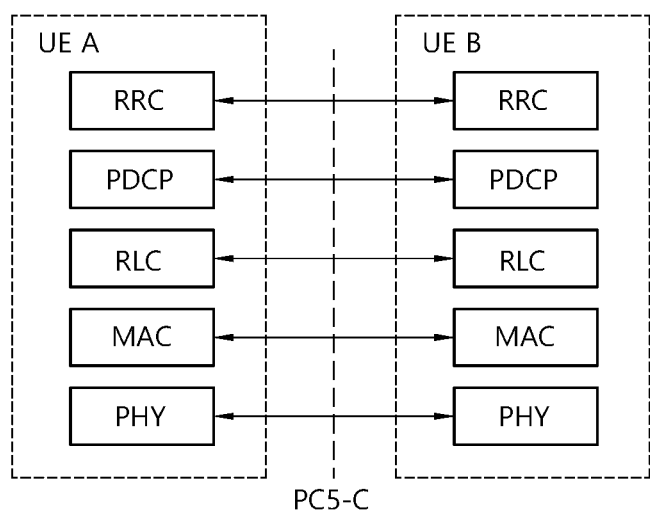
(b)

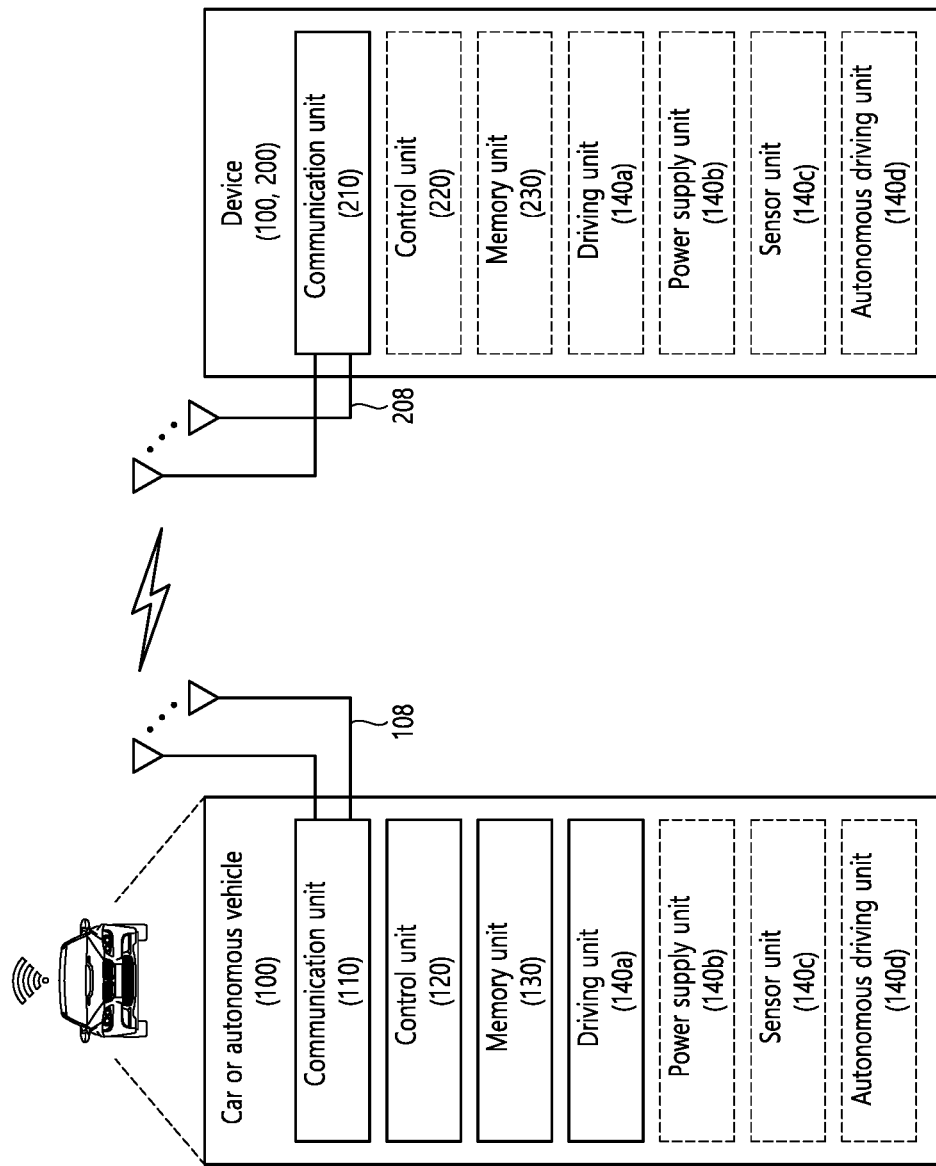

SIDELINK POSITIONING BASED ON PRS TRANSMISSION OF SINGLE USER EQUIPMENT IN NR V2X

CROSS-REFERENCE TO RELATED APPLICATIONS

This application is the National Stage filing under 35 U.S.C. 371 of International Application No. PCT/KR2020/007313, filed on Jun. 5, 2020, and also claims the benefit of earlier filing date and right of priority to Korean Patent Application No. 10-2019-0066888, filed on Jun. 5, 2019, the contents of which are all incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in a wireless communication system, an existing service for measuring a location of a UE may be performed by a Location service (LCS) server. That is, for example, when a UE, a Mobility Management Entity (MME), or an LCS server attempts to measure a location of a specific UE, the LCS server may be finally requested to provide a location measurement service of the corresponding UE. In order to perform this request, the LCS server may request a base station to perform a process of measuring the location of the corresponding UE. In this case, for example, the LCS server may configure or determine parameters related to a Positioning Reference Signal (PRS) transmitted by the base station or the terminal for location measurement. For example, for position estimation through downlink transmission, a plurality of base stations may transmit PRSs to a UE, and the UE may feedback a difference in reception times of PRSs transmitted from each base station to the LCS server. Though this, the LCS server may finally estimate the location of the UE. For example, for position estimation through uplink transmission, the UE may transmit sounding reference signals (SRSs) to a plurality of base stations, and each base station may transmit a reception time of the SRS transmitted from the UE to the LCS server. Though this, the LCS server may finally estimate the location of the UE. For example, using an identification (ID) of a cell to which a base station belongs, the UE may feedback reception power for a reference signal received from the base station to the LSC server. Though this, the LCS server may roughly estimate the distance the UE is away from the base station. For example, a position and a location may have the same meaning.

For example, the above-described prior art may estimate the location of the UE, based on a core network including an MME and an LCS server and that manages the location estimation of the UE, a radio access network (RAN) including a plurality of base stations and transmission point (TP). Therefore, a Uu interface connecting the UE and the base station is used, and the UE must exist within a coverage of the base station. However, if an area is out of the coverage of the base station or without the help of the base station, it may not be possible to estimate the location of the UE based on the mutual communication of the UEs.

Technical Solutions

According to an embodiment of the present disclosure, there is provided a method of performing wireless communication by a first device. The method may include transmitting, to a plurality of second devices, at least one positioning reference signal (PRS); receiving, from the plurality of second devices, location information of the plurality of second devices and time of arrival (TOA) values of the plurality of second devices; and determining a location of the first device based on the location information of the plurality of second UEs and the TOA values of the plurality of second devices. For example, the TOA values are determined based on the time when the plurality of second devices received the at least one PRS.

Effects of the Disclosure

A UE may effectively perform sidelink communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

FIG. 30 shows a car or an autonomous vehicle, in accordance with an embodiment of the present disclosure.

DESCRIPTION OF EXEMPLARY EMBODIMENTS

Figure 1:
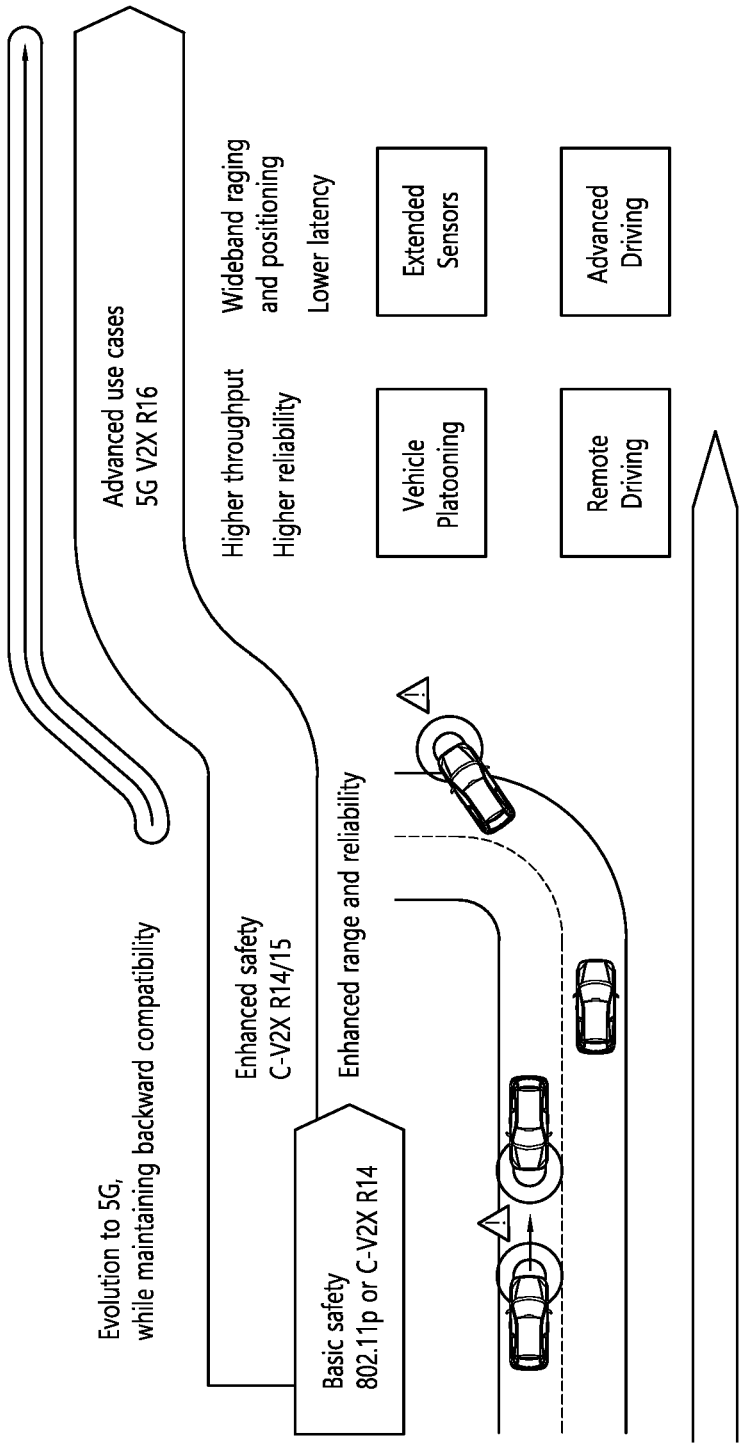
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
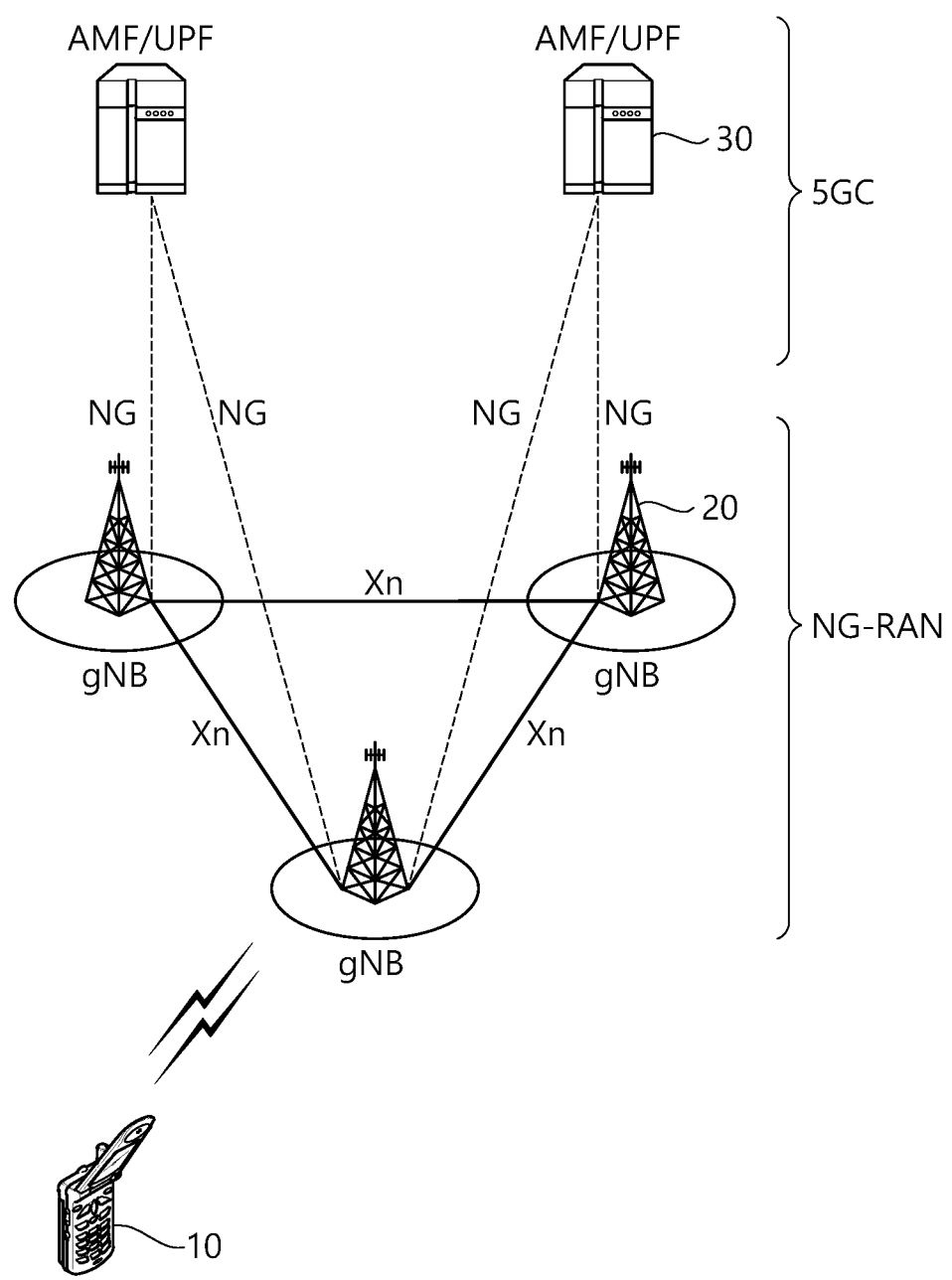
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
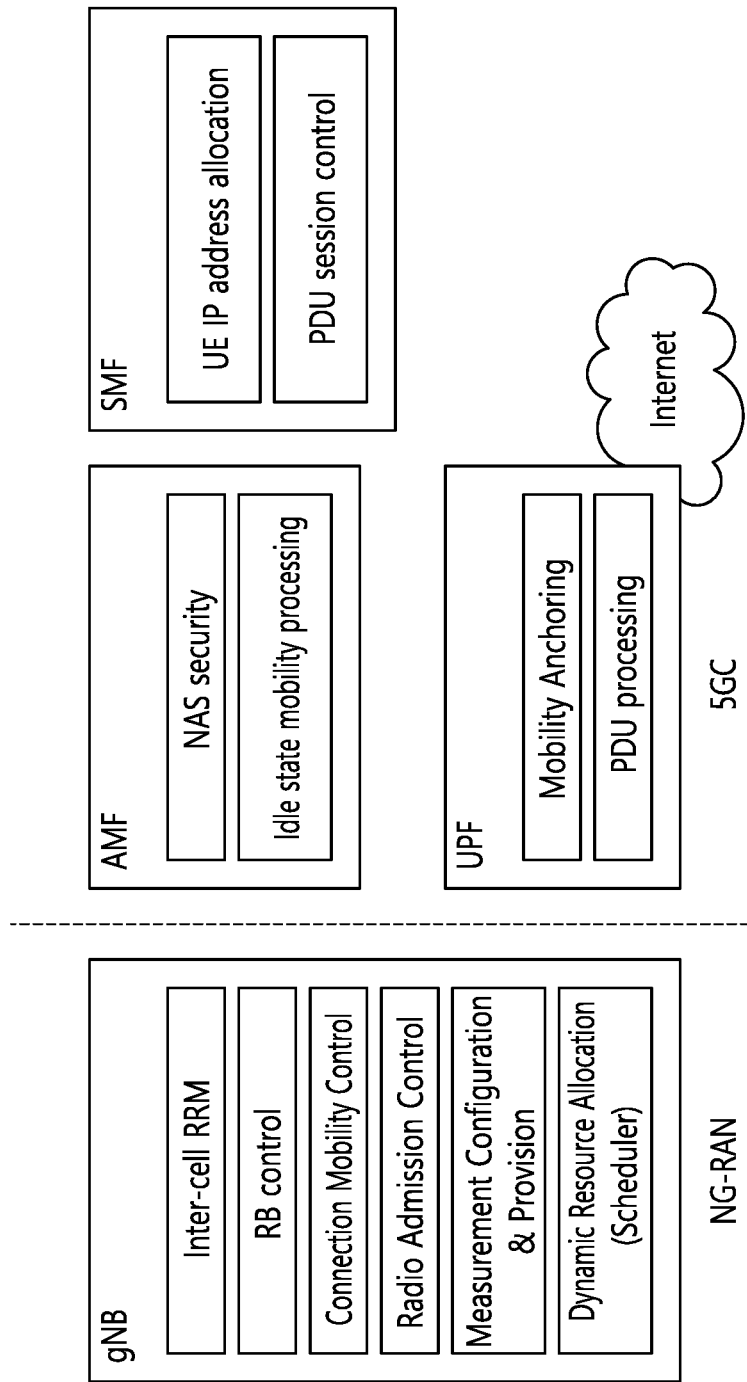
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
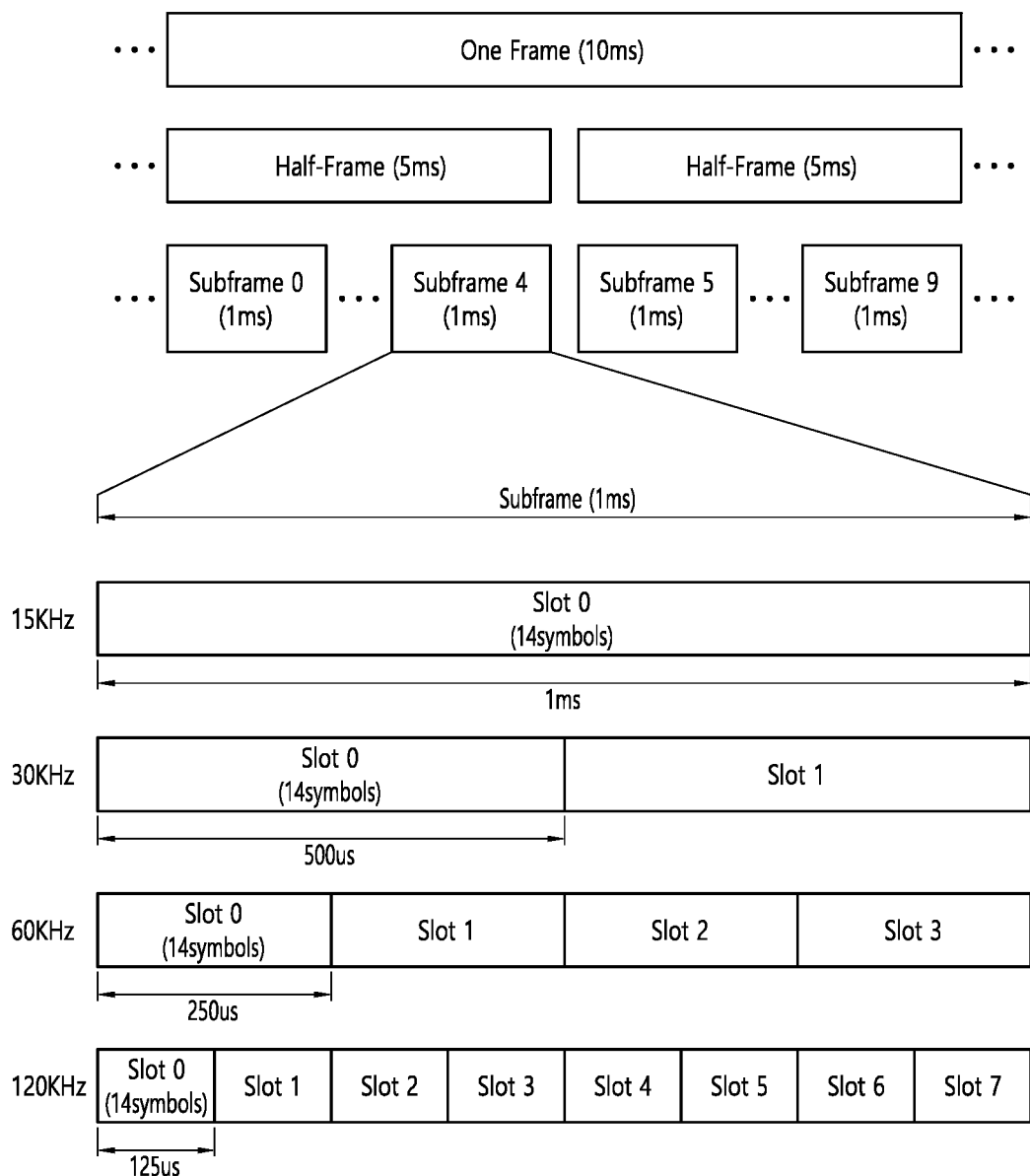
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
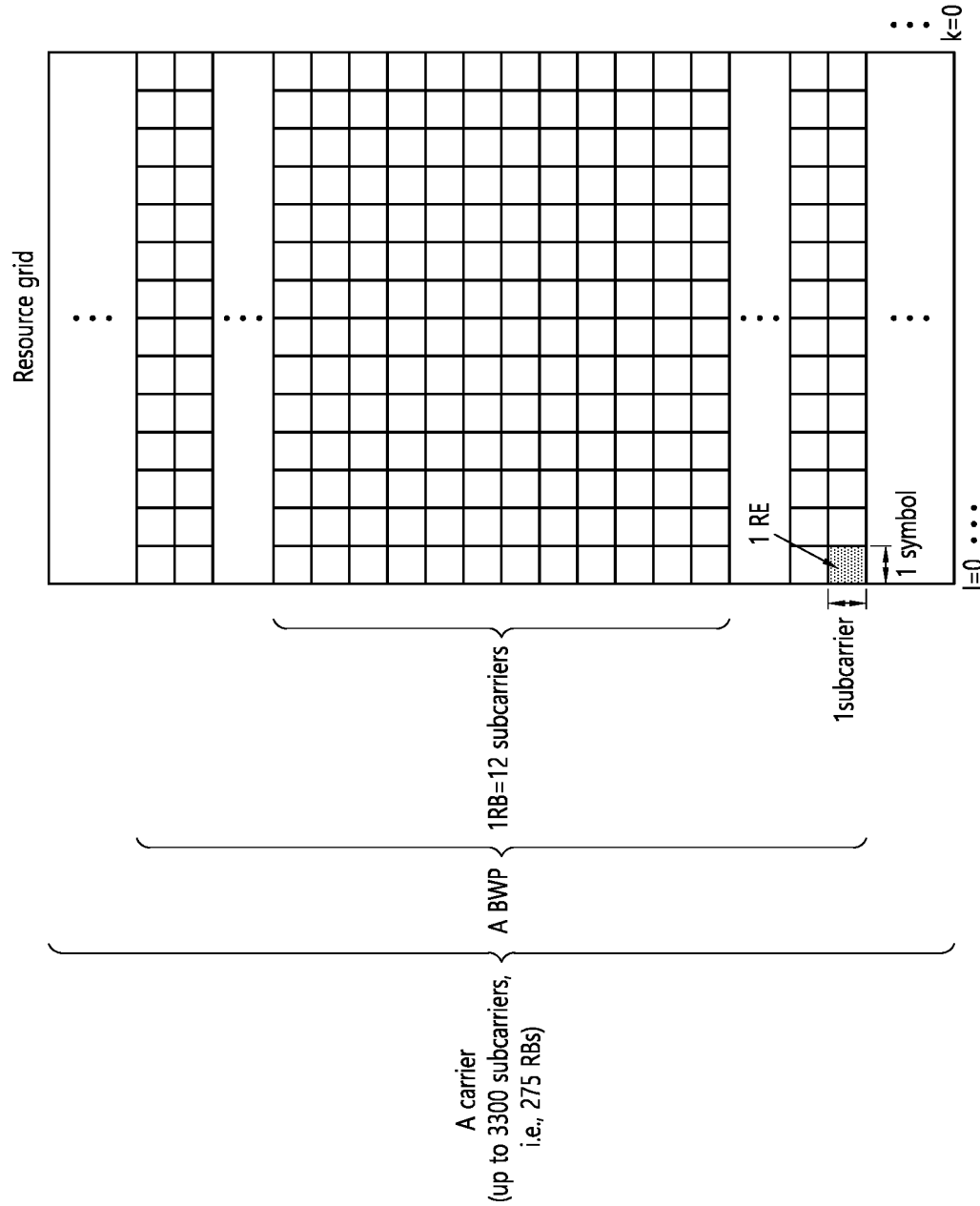
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
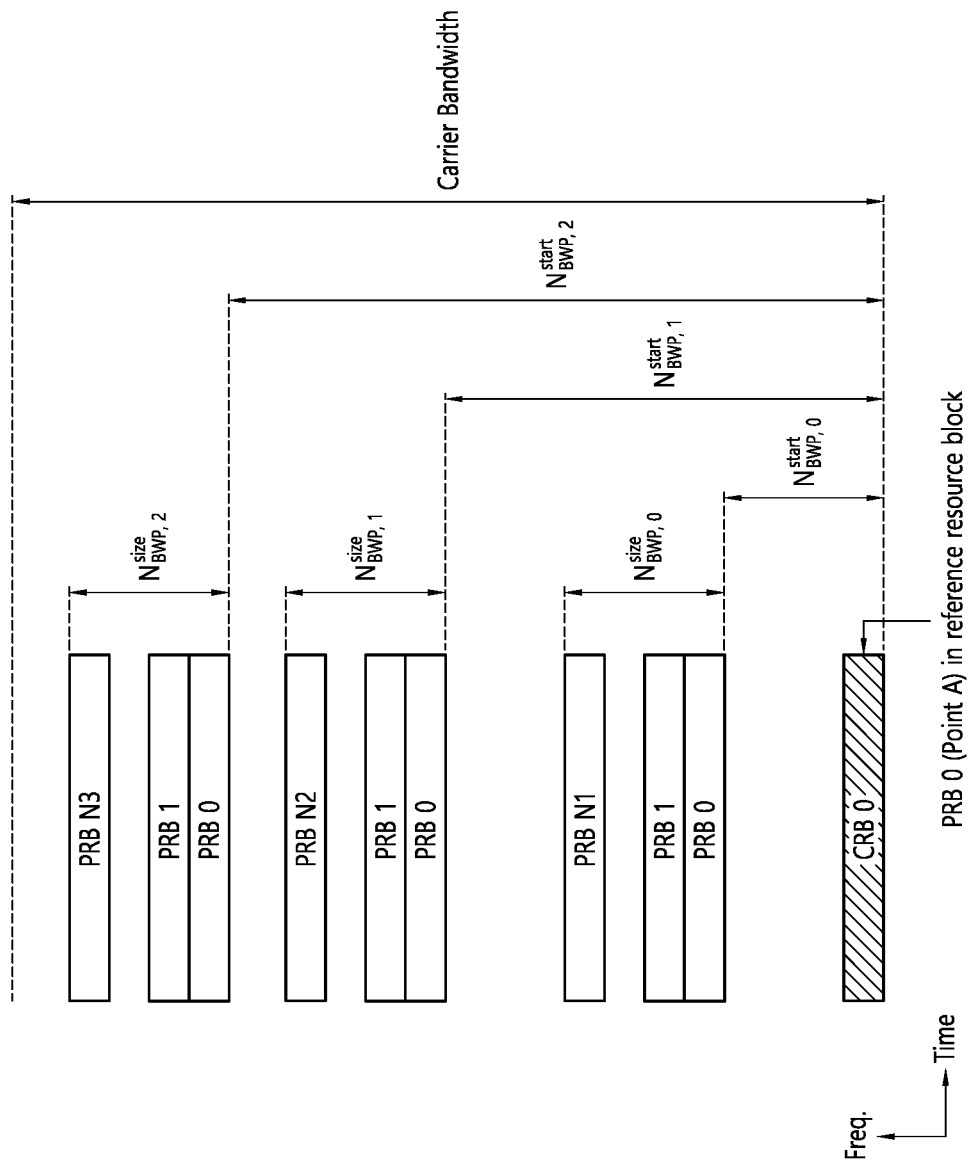
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
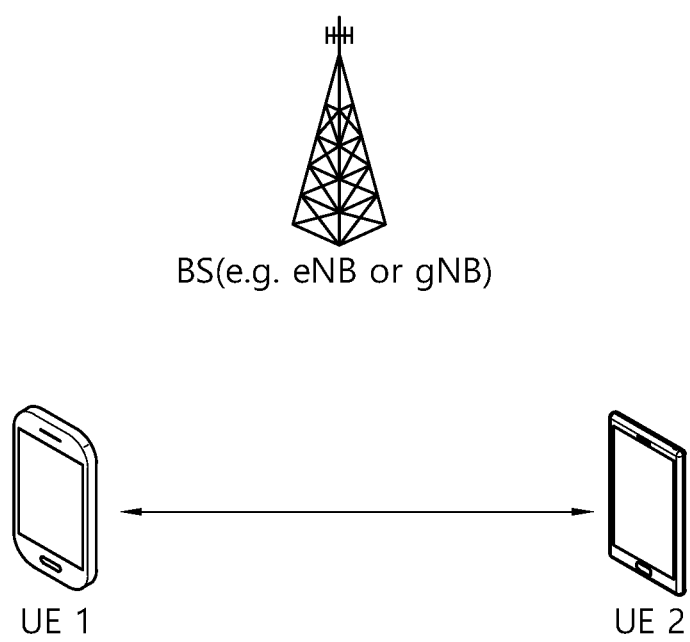
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
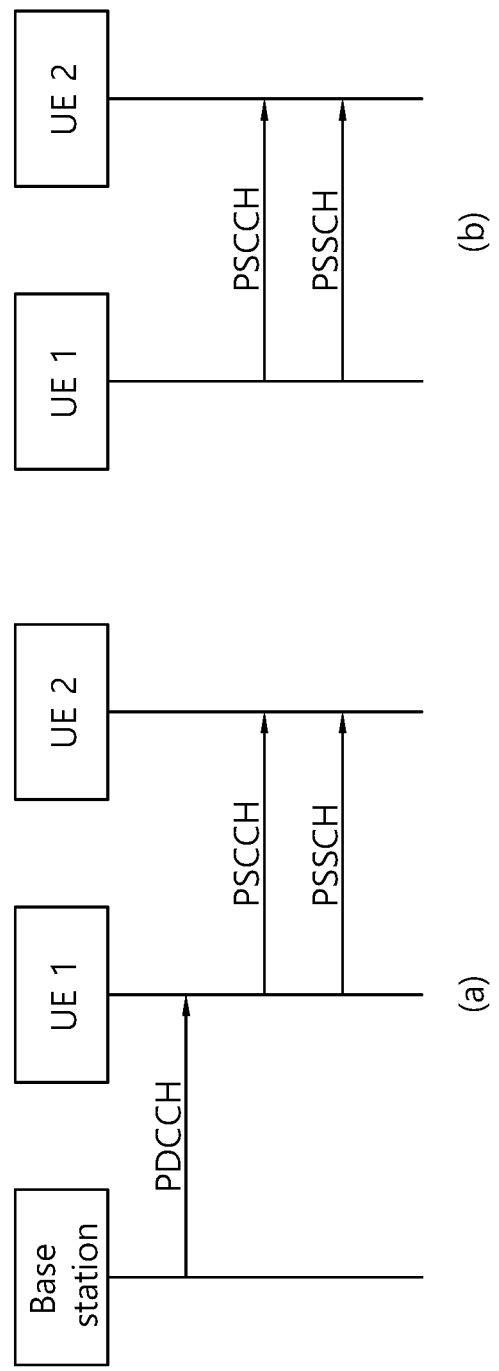
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
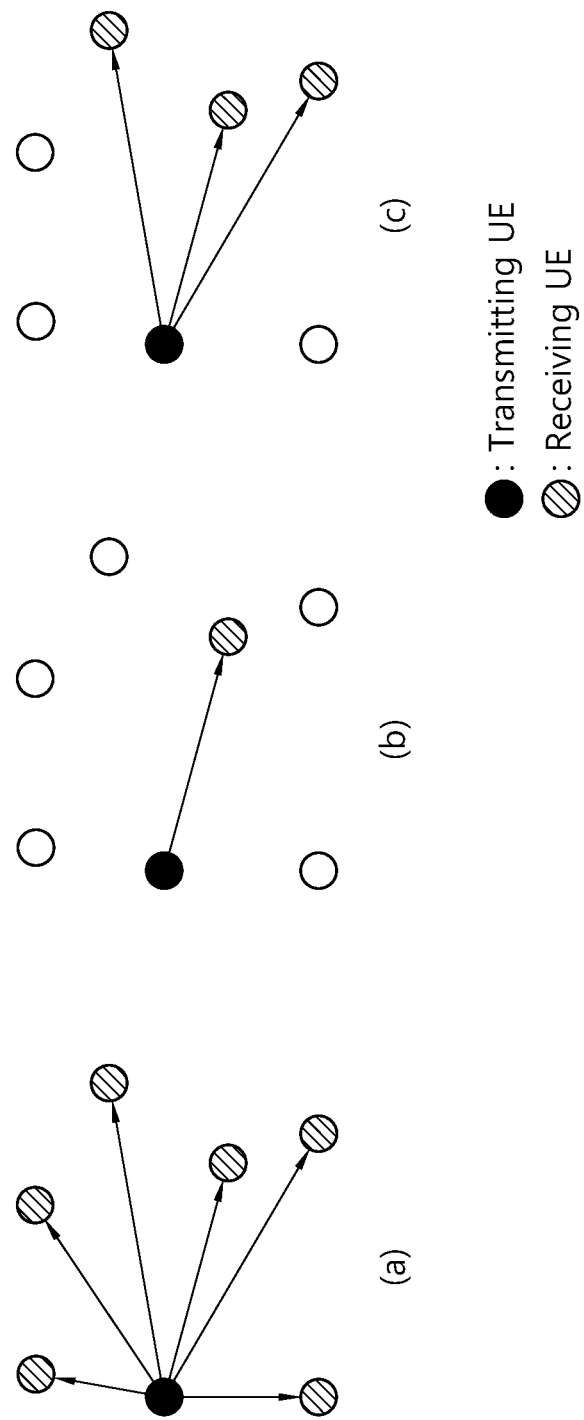
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, positioning will be described.

Figure 12:
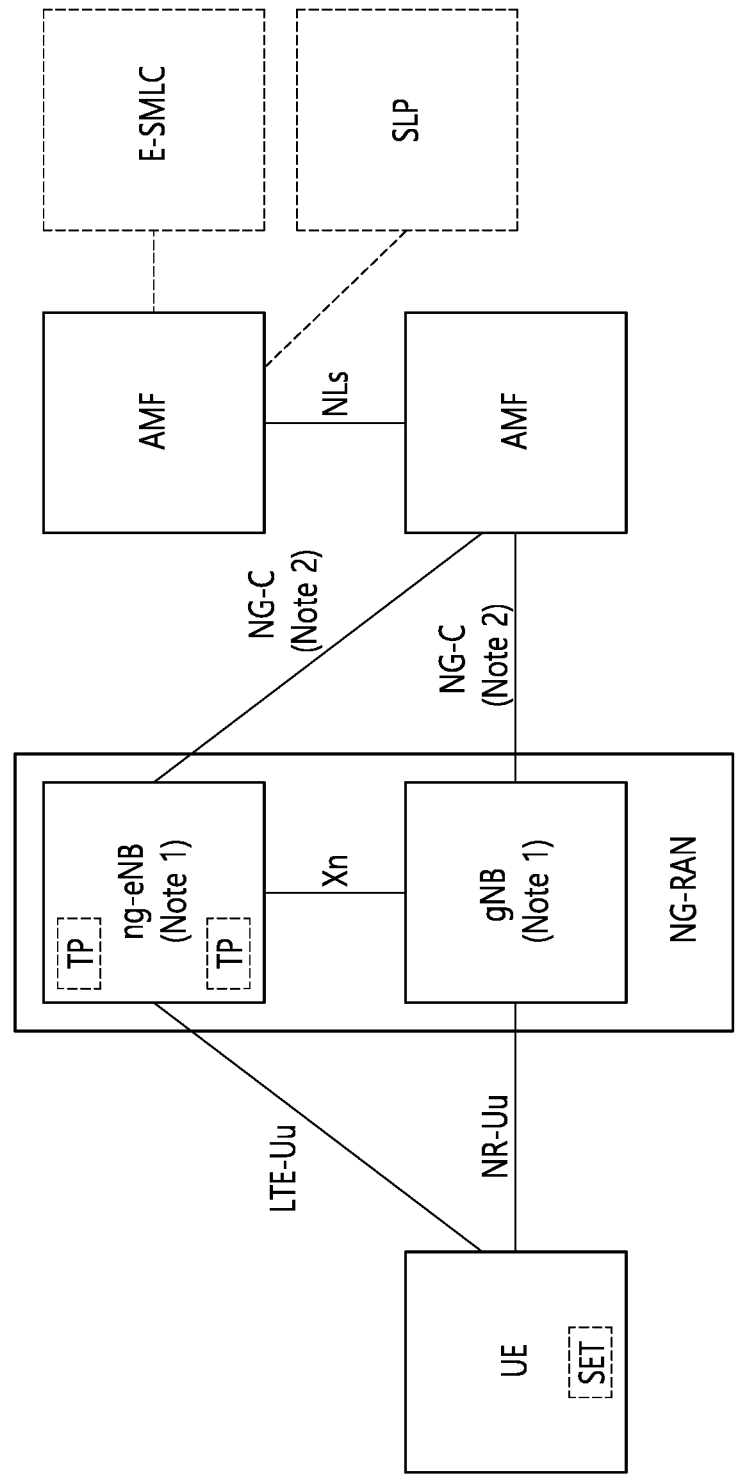
FIG. 12 shows an example of an architecture of a 5G system capable of positioning a UE having access to a next generation-radio access network (NG-RAN) or an E-UTRAN in accordance with an embodiment of the present disclosure.

FIG. 12 shows an example of an architecture of a 5G system capable of positioning a UE having access to a next generation-radio access network (NG-RAN) or an E-UTRAN in accordance with an embodiment of the present disclosure. The embodiment of FIG. 12 may be combined with various embodiments of the present disclosure.

Referring to FIG. 12, an AMF may receive a request for a location service related to a specific target UE from a different entity such as a gateway mobile location center (GMLC), or may determine to start the location service in the AMF itself instead of the specific target UE. Then, the AMF may transmit a location service request to a location management function (LMF). Upon receiving the location service request, the LMF may process the location service request and return a processing request including an estimated location or the like of the UE to the AMF. Meanwhile, if the location service request is received from the different entity such as GMLC other than the AMF, the AMF may transfer to the different entity the processing request received from the LMF.

A new generation evolved-NB (ng-eNB) and a gNB are network elements of NG-RAN capable of providing a measurement result for location estimation, and may measure a radio signal for a target UE and may transfer a resultant value to the LMF. In addition, the ng-eNB may control several transmission points (TPs) such as remote radio heads or PRS-dedicated TPs supporting a positioning reference signal (PRS)-based beacon system for E-UTRA.

The LMF may be connected to an enhanced serving mobile location centre (E-SMLC), and the E-SMLC may allow the LMF to access E-UTRAN. For example, the E-SMLC may allow the LMF to support observed time difference of arrival (OTDOA), which is one of positioning methods of E-UTRAN, by using downlink measurement obtained by a target UE through a signal transmitted from the gNB and/or the PRS-dedicated TPs in the E-UTRAN.

Meanwhile, the LMF may be connected to an SUPL location platform (SLP). The LMF may support and manage different location determining services for respective target UEs. The LMF may interact with a serving ng-eNB or serving gNB for the target UE to obtain location measurement of the UE. For positioning of the target UE, the LMF may determine a positioning method based on a location service (LCS) client type, a requested quality of service (QoS), UE positioning capabilities, gNB positioning capabilities, and ng-eNB positioning capabilities, or the like, and may apply such a positioning method to the serving gNB and/or the serving ng-eNB. In addition, the LMF may determine additional information such as a location estimation value for the target UE and accuracy of location estimation and speed. The SLP is a secure user plane location (SUPL) entity in charge of positioning through a user plane.

The UE may measure a downlink signal through NG-RAN, E-UTRAN, and/or other sources such as different global navigation satellite system (GNSS) and terrestrial beacon system (TBS), wireless local access network (WLAN) access points, Bluetooth beacons, UE barometric pressure sensors or the like. The UE may include an LCS application. The UE may communicate with a network to which the UE has access, or may access the LCS application through another application included in the UE. The LCS application may include a measurement and calculation function required to determine a location of the UE. For example, the UE may include an independent positioning function such as a global positioning system (GPS), and may report the location of the UE independent of NG-RAN transmission. Positioning information obtained independently as such may be utilized as assistance information of the positioning information obtained from the network.

Figure 13:
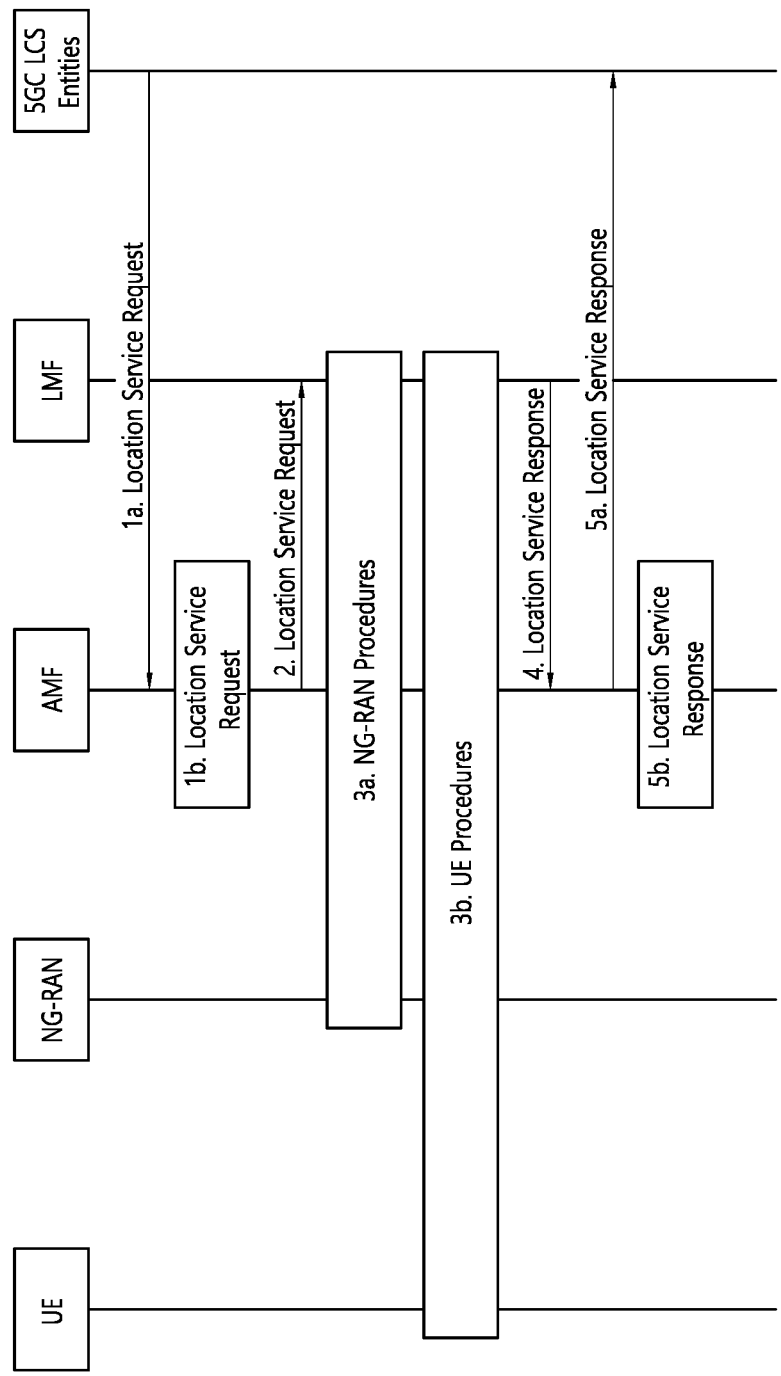
FIG. 13 shows an example of implementing a network for measuring a location of a UE in accordance with an embodiment of the present disclosure.

FIG. 13 shows an example of implementing a network for measuring a location of a UE in accordance with an embodiment of the present disclosure. The embodiment of FIG. 13 may be combined with various embodiments of the present disclosure.

When the UE is in a connection management (CM)-IDLE state, if an AMF receives a location service request, the AMF may establish a signaling connection with the UE, and may request for a network trigger service to allocate a specific serving gNB or ng-eNB. Such an operational process is omitted in FIG. D2. That is, it may be assumed in FIG. D2 that the UE is in a connected mode. However, due to signaling and data inactivation or the like, the signaling connection may be released by NG-RAN while a positioning process is performed.

A network operation process for measuring a location of a UE will be described in detail with reference to FIG. 13. In step a1, a 5GC entity such as GMLC may request a serving AMF to provide a location service for measuring a location of a target UE. However, even if the GMLC does not request for the location service, based on step 1b, the serving AMF may determine that the location service for measuring the location of the target UE is required. For example, to measure the location of the UE for an emergency call, the serving AMF may determine to directly perform the location service.

Thereafter, the AMF may transmit the location service request to an LMF based on step 2, and the LMF may start location procedures to obtain location measurement data or location measurement assistance data together with a serving ng-eNB and a serving gNB. Additionally, based on step 3b, the LMF may start location procedures for downlink positioning together with the UE. For example, the LMF may transmit assistance data defined in 3GPP TS 36.355, or may obtain a location estimation value or a location measurement value. Meanwhile, step 3b may be performed additionally after step 3a is performed, or may be performed instead of step 3a.

In step 4, the LMF may provide a location service response to the AMF. In addition, the location service response may include information on whether location estimation of the UE is successful and a location estimation value of the UE. Thereafter, if the procedure of FIG. 13 is initiated by step a1, the AMF may transfer the location service response to a 5GC entity such as GMLC, and if the procedure of FIG. D2 is initiated by step 1b, the AMF may use the location service response to provide a location service related to an emergency call or the like.

Figure 14:
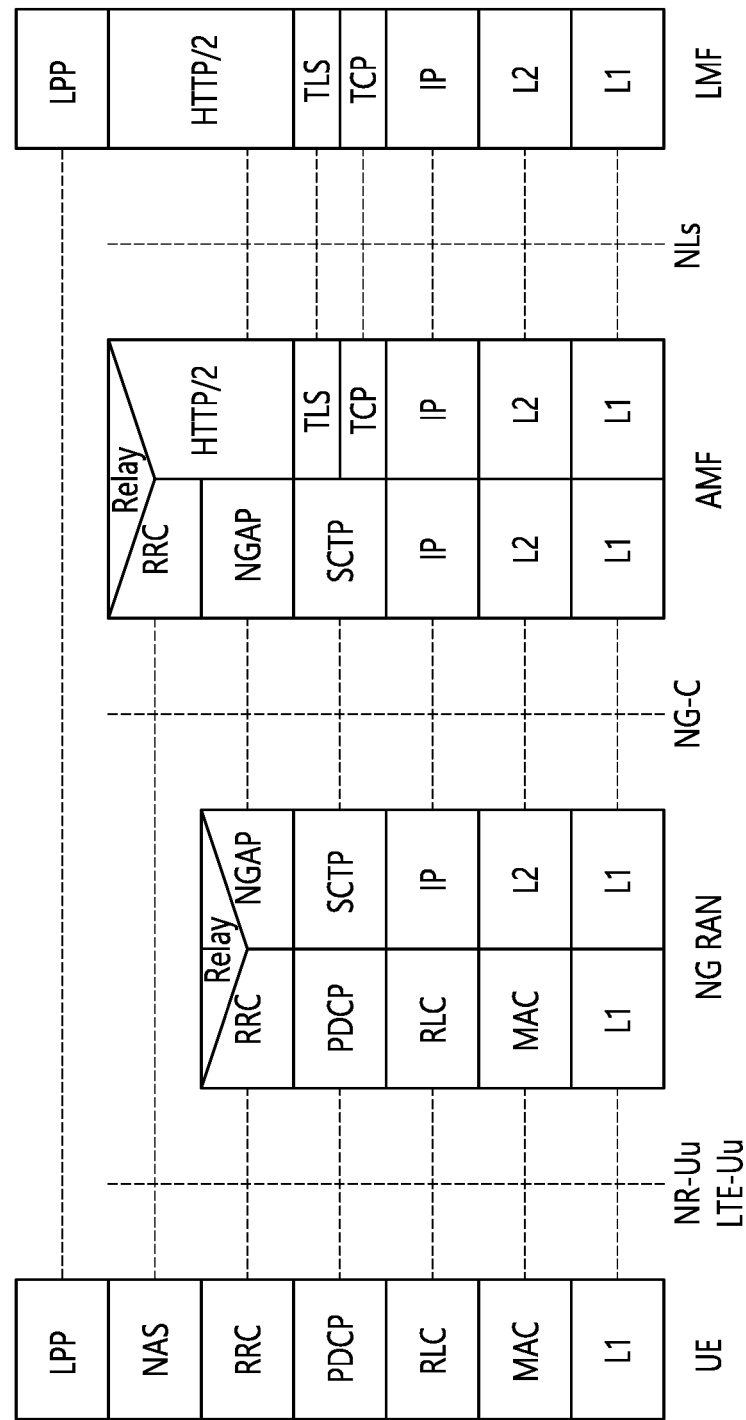
FIG. 14 shows an example of a protocol layer used to support LTE positioning protocol (LPP) message transmission between an LMF and a UE in accordance with an embodiment of the present disclosure.

FIG. 14 shows an example of a protocol layer used to support LTE positioning protocol (LPP) message transmission between an LMF and a UE in accordance with an embodiment of the present disclosure. The embodiment of FIG. 14 may be combined with various embodiments of the present disclosure.

An LPP PDU may be transmitted through a NAS PDU between an AMF and the UE. Referring to FIG. 14, an LPP may be terminated between a target device (e.g., a UE in a control plane or an SUPL enabled terminal (SET) in a user plane) and a location server (e.g., an LMF in the control plane and an SLP in the user plane). The LPP message may be transferred in a form of a transparent PDU through an intermediary network interface by using a proper protocol such as an NG application protocol (NGAP) through an NG-control plane (NG-C) interface and NAS/RRC or the like through an NR-Uu interface. The LPP protocol may enable positioning for NR and LTE by using various positioning methods.

For example, based on the LPP protocol, the target device and the location server may exchange mutual capability information, assistance data for positioning, and/or location information. In addition, an LPP message may be used to indicate exchange of error information and/or interruption of the LPP procedure.

Figure 15:
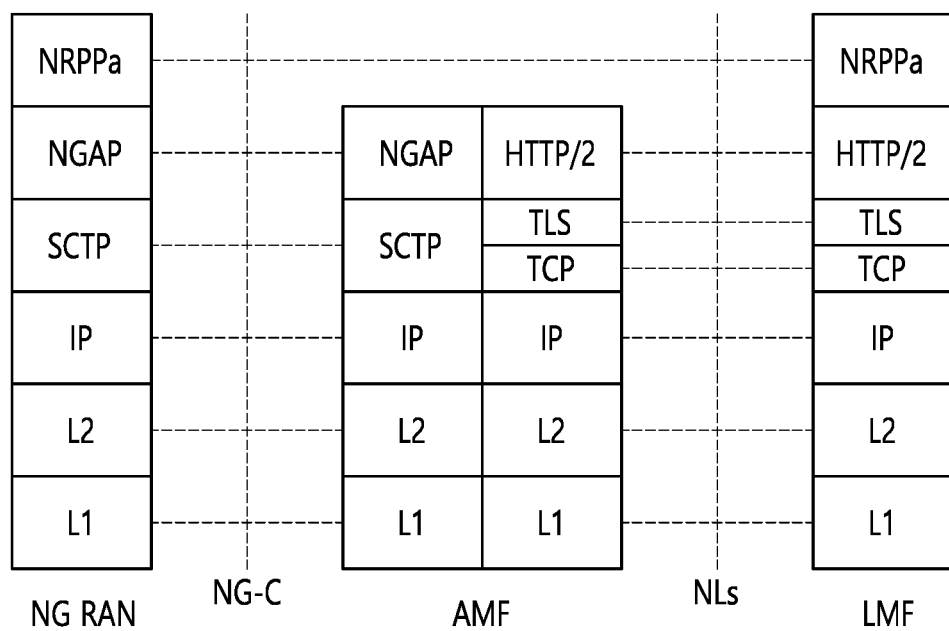
FIG. 15 shows an example of a protocol layer used to support NR positioning protocol A (NRPPa) PDU transmission between an LMF and an NG-RAN node in accordance with an embodiment of the present disclosure.

FIG. 15 shows an example of a protocol layer used to support NR positioning protocol A (NRPPa) PDU transmission between an LMF and an NG-RAN node in accordance with an embodiment of the present disclosure. The embodiment of FIG. 15 may be combined with various embodiments of the present disclosure.

The NRPPa may be used for information exchange between the NG-RAN node and the LMF. Specifically, the NRPPa may exchange an enhanced-cell ID (E-CID) for measurement, data for supporting an OTDOA positioning method, and a cell-ID, cell location ID, or the like for an NR cell ID positioning method, transmitted from the ng-eNB to the LMF. Even if there is no information on an associated NRPPa transaction, the AMF may route NRPPa PDUs based on a routing ID of an associated LMR through an NG-C interface.

A procedure of an NRPPa protocol for location and data collection may be classified into two types. A first type is a UE associated procedure for transferring information on a specific UE (e.g., location measurement information or the like), and a second type is a non UE associated procedure for transferring information (e.g., gNB/ng-eNB/TP timing information, etc.) applicable to an NG-RAN node and associated TPs. The two types of the procedure may be independently supported or may be simultaneously supported.

Meanwhile, examples of positioning methods supported in NG-RAN may include GNSS, OTDOA, enhanced cell ID (E-CID), barometric pressure sensor positioning, WLAN positioning, Bluetooth positioning and terrestrial beacon system (TBS), uplink time difference of arrival (UTDOA), etc.

(1) OTDOA (Observed Time Difference Of Arrival)

Figure 16:
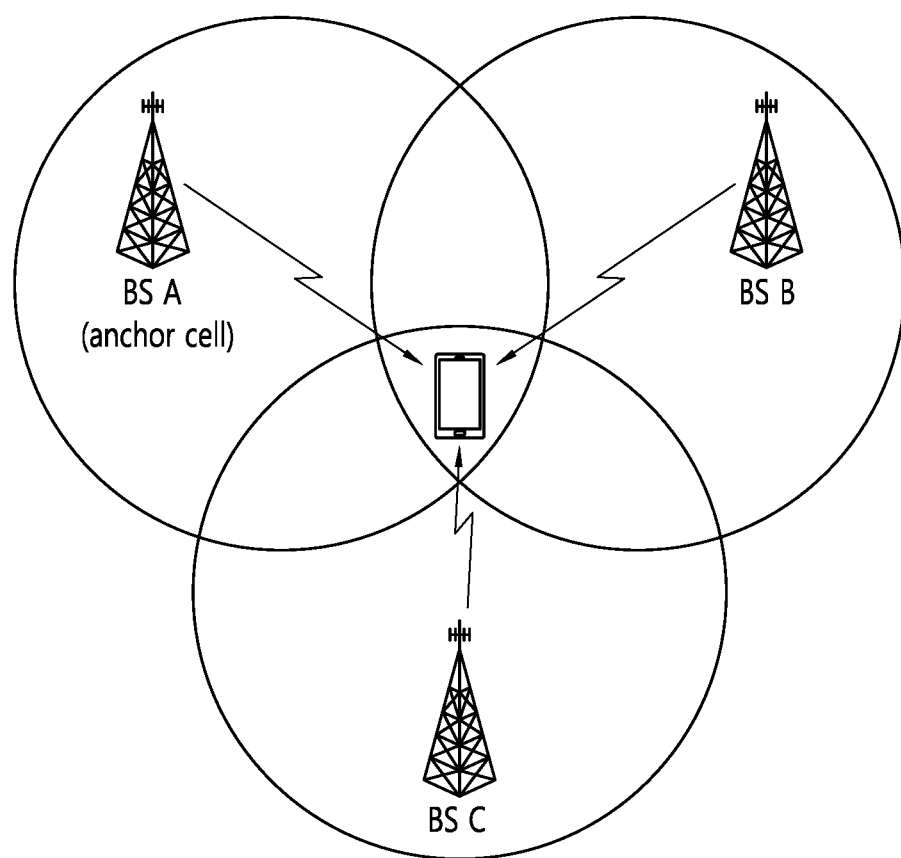
FIG. 16 is a drawing for explaining an OTDOA positioning method in accordance with an embodiment of the present disclosure.

FIG. 16 is a drawing for explaining an OTDOA positioning method in accordance with an embodiment of the present disclosure. The embodiment of FIG. 16 may be combined with various embodiments of the present disclosure.

The OTDOA positioning method uses measurement timing of downlink signals received by a UE from an eNB, an ng-eNB, and a plurality of TPs including a PRS-dedicated TP. The UE measures timing of downlink signals received by using location assistance data received from a location server. In addition, a location of the UE may be determined based on such a measurement result and geometric coordinates of neighboring TPs.

A UE connected to a gNB may request for a measurement gap for OTDOA measurement from the TP. If the UE cannot recognize a single frequency network (SFN) for at least one TP in the OTDOA assistance data, the UE may use an autonomous gap to obtain an SNF of an OTDOA reference cell before the measurement gap is requested to perform reference signal time difference (RSTD) measurement.

Herein, the RSTD may be defined based on a smallest relative time difference between boundaries of two subframes received respectively from a reference cell and a measurement cell. That is, the RSTD may be calculated based on a relative time difference between a start time of a subframe received from the measurement cell and a start time of a subframe of a reference cell closest to the start time of the subframe received from the measurement cell. Meanwhile, the reference cell may be selected by the UE.

For correct OTDOA measurement, it may be necessary to measure a time of arrival (TOA) of a signal received from three or more TPs or BSs geometrically distributed. For example, a TOA may be measured for each of a TP1, a TP2, and a TP3, and RSTD for TP 1-TP 2, RSTD for TP 2-TP 3, and RSTD for TP 3-TP 1 may be calculated for the three TOAs. Based on this, a geometric hyperbola may be determined, and a point at which these hyperbolas intersect may be estimated as a location of a UE. In this case, since accuracy and/or uncertainty for each TOA measurement may be present, the estimated location of the UE may be known as a specific range based on measurement uncertainty.

For example, RSTD for two TPs may be calculated based on Equation D1.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 1]

Herein, c may be the speed of light, {xt, yt} may be a (unknown) coordinate of a target UE, {xi, yi} may be a coordinate of a (known) TP, and {x1, y1} may be a coordinate of a reference TP (or another TP). Herein, (Ti−T1) may be referred to as "real time differences (RTDs)" as a transmission time offset between two TPs, and ni, n1 may represent values related to UE TOA measurement errors.

(2) E-CID (Enhanced Cell ID)

In a cell ID (CID) positioning method, a location of a UE may be measured through geometric information of a serving ng-eNB, serving gNB, and/or serving cell of the UE. For example, the geometric information of the serving ng-eNB, serving gNB, and/or serving cell may be obtained through paging, registration, or the like.

Meanwhile, in addition to the CID positioning method, an E-CID positioning method may use additional UE measurement and/or NG-RAN radio resources or the like to improve a UE location estimation value. In the E-CID positioning method, although some of the measurement methods which are the same as those used in a measurement control system of an RRC protocol may be used, additional measurement is not performed in general only for location measurement of the UE. In other words, a measurement configuration or a measurement control message may not be provided additionally to measure the location of the UE. Also, the UE may not expect that an additional measurement operation only for location measurement will be requested, and may report a measurement value obtained through measurement methods in which the UE can perform measurement in a general manner.

For example, the serving gNB may use an E-UTRA measurement value provided from the UE to implement the E-CID positioning method.

Examples of a measurement element that can be used for E-CID positioning may be as follows.

UE measurement: E-UTRA reference signal received power (RSRP), E-UTRA reference signal received quality (RSRQ), UE E-UTRA Rx-Tx Time difference, GSM EDGE random access network (GERAN)/WLAN reference signal strength indication (RSSI), UTRAN common pilot channel (CPICH) received signal code power (RSCP), UTRAN CPICH Ec/Io E-UTRAN measurement: ng-eNB Rx-Tx Time difference, timing advance (TADV), angle of arrival (AoA)

Herein, the TADV may be classified into Type 1 and Type 2 as follows.

TADV Type 1=(ng-eNB Rx-Tx time difference)+(UE E-UTRA Rx-Tx time difference)

TADV Type 2=ng-eNB Rx-Tx time difference

Meanwhile, AoA may be used to measure a direction of the UE. The AoA may be defined as an estimation angle with respect to the location of the UE counterclockwise from a BS/TP. In this case, a geographic reference direction may be north. The BS/TP may use an uplink signal such as a sounding reference signal (SRS) and/or a demodulation reference signal (DMRS) for AoA measurement. In addition, the larger the arrangement of the antenna array, the higher the measurement accuracy of the AoA. When the antenna arrays are arranged with the same interval, signals received from adjacent antenna elements may have a constant phase-rotate.

(3) UTDOA (Uplink Time Difference of Arrival)

UTDOA is a method of determining a location of a UE by estimating an arrival time of SRS. When calculating an estimated SRS arrival time, the location of the UE may be estimated through an arrival time difference with respect to another cell (or BS/TP) by using a serving cell as a reference cell. In order to implement the UTDOA, E-SMLC may indicate a serving cell of a target UE to indicate SRS transmission to the target UE. In addition, the E-SMLC may provide a configuration such as whether the SRS is periodical/aperiodical, a bandwidth, frequency/group/sequence hopping, or the like.

Meanwhile, an existing service for measuring a location of a UE may be performed by a Location service (LCS) server. That is, for example, when a UE, a Mobility Management Entity (MME), or an LCS server attempts to measure a location of a specific UE, the LCS server may be finally requested to provide a location measurement service of the corresponding UE. In order to perform this request, the LCS server may request a base station to perform a process of measuring the location of the corresponding UE. In this case, for example, the LCS server may configure or determine parameters related to a Positioning Reference Signal (PRS) transmitted by the base station or the terminal for location measurement. For example, for position estimation through downlink transmission, a plurality of base stations may transmit PRSs to a UE, and the UE may feedback a difference in reception times of PRSs transmitted from each base station to the LCS server. Though this, the LCS server may finally estimate the location of the UE. For example, for position estimation through uplink transmission, the UE may transmit sounding reference signals (SRSs) to a plurality of base stations, and each base station may transmit a reception time of the SRS transmitted from the UE to the LCS server. Though this, the LCS server may finally estimate the location of the UE. For example, using an identification (ID) of a cell to which a base station belongs, the UE may feedback reception power for a reference signal received from the base station to the LSC server. Though this, the LCS server may roughly estimate the distance the UE is away from the base station. For example, a position and a location may have the same meaning.

For example, the above-described prior art may estimate the location of the UE, based on a core network including an MME and an LCS server and that manages the location estimation of the UE, a radio access network (RAN) including a plurality of base stations and transmission point (TP). Therefore, a Uu interface connecting the UE and the base station is used, and the UE must exist within a coverage of the base station. However, if an area is out of the coverage of the base station or without the help of the base station, it may not be possible to estimate the location of the UE based on the mutual communication of the UEs. The present disclosure proposes a method for estimating the location of a UE, without the aid of a base station or an LCS server, based on the mutual operation of the UEs.

For example, the UE may include a mobile device, a V2X module, an IoT device, or a UE-type Road Side Unit (RSU). For example, in the present disclosure, from the perspective of the positioning service, the UE may be divided into two types of roles. For example, a target UE may be defined as a UE that is a target of location estimation. For example, a server UE may be defined as a UE that performs an operation to assist in estimating the location of a target UE. Sidelink positioning estimates the location of the UE only through the operation between the target UE and the server UE, and other entities participating in the existing positioning technology based on the Uu interface such as MME, LCS server, base station, etc. may not be required.

For example, the present disclosure proposes a sidelink positioning method for estimating the location of a UE through only communication between a target UE and a server UE without the aid of a base station and an LCS server. For example, a S-TDOA (Sidelink Time Difference of Arrival) method in which a single target UE transmits at least one PRS and a plurality of server UEs receive the at least one PRS to estimate a location of the target UE is proposed.

Figure 17:
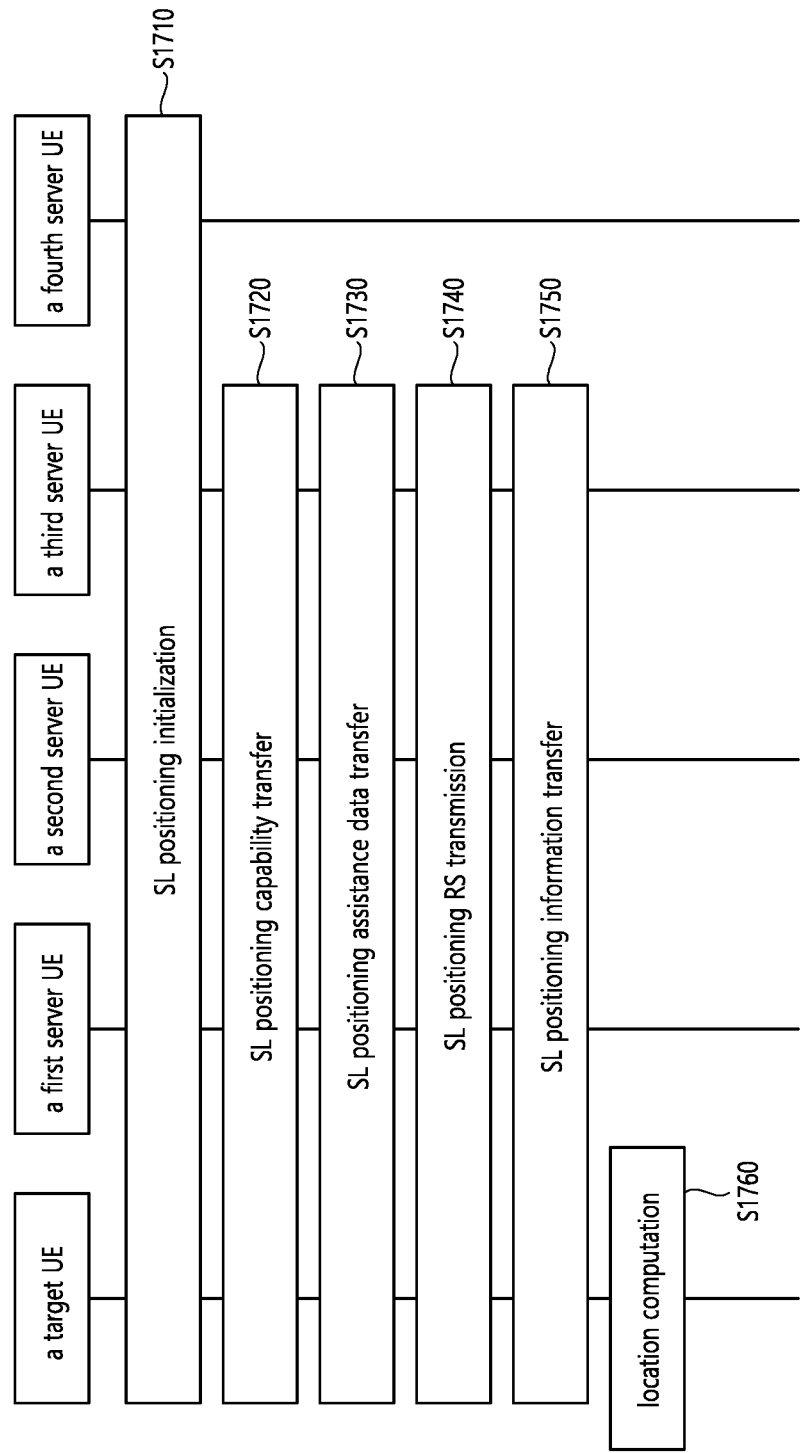
FIG. 17 shows a procedure in which a target UE performs S-TDOA positioning with a plurality of server UEs in accordance with an embodiment of the present disclosure.

FIG. 17 shows a procedure in which a target UE performs S-TDOA positioning with a plurality of server UEs in accordance with an embodiment of the present disclosure. The embodiment of FIG. 17 may be combined with various embodiments of the present disclosure.

Referring to FIG. 17, in step S1710, the target UE may determine a plurality of server UEs to participate in a positioning process of the target UE from among its neighboring UEs. For example, the target UE may perform a sidelink positioning initialization process with respect to the first server UE, the second server UE, the third server UE, and the fourth server UE, which are neighboring UEs. The target UE may determine the first server UE, the second server UE, and the third server UE as server UEs to participate in the positioning process of the target UE.

In step S1720, the target UE may request the server UEs to transmit information related to the capability of the UE. For example, the target UE may request the first server UE, the second server UE, and the third server UE to transmit information related to the capability of the UE. For example, the target UE may receive information related to the capability of each server UE from the first server UE, the second server UE, and the third server UE.

In step S1730, the target UE may transmit assistance data to a plurality of server UEs. For example, the target UE may transmit assistance data related to sidelink positioning to the first server UE, the second server UE, and the third server UE.

In step S1740, the target UE may transmit a plurality of reference signals related to sidelink positioning to a plurality of server UEs. For example, the target UE may transmit a PRS to each of the first server UE, the second server UE, and the third server UE. For example, each server UE may measure a TOA between the target UE and each server UE based on reception time of the PRS received from the target UE.

In step S1750, the target UE may receive positioning information from the first server UE, the second server UE, and the third server UE. For example, the target UE may receive a TOA value measured by each server UE from a plurality of server UEs. For example, the target UE may request information related to sidelink positioning from a plurality of server UEs. For example, the target UE may request information related to sidelink positioning from the first server UE, the second server UE, and the third server UE. For example, the target UE may receive a TOA value measured by each server UE from a plurality of server UEs.

In step S1760, the target UE may calculate or determine a location of the target UE. For example, the target UE may calculate or determine the location of the target UE based on the information related to sidelink positioning. For example, the target UE may estimate the location of the target UE based on TOA values received from each server terminal.

In the embodiment of FIG. 17, for example, signal and data transmission related to all procedures may be performed based on sensing of a channel. For example, the UE may sense a channel and transmit signals and data through resources that are not used by other UEs on a corresponding channel or resources that are not scheduled to be used by other UEs on the corresponding channel. Also, for example, the UE may not transmit signals and data with respect to resources used by other UEs on a corresponding channel or resources scheduled to be used by other UEs on a corresponding channel by sensing the channel.

Figure 18:
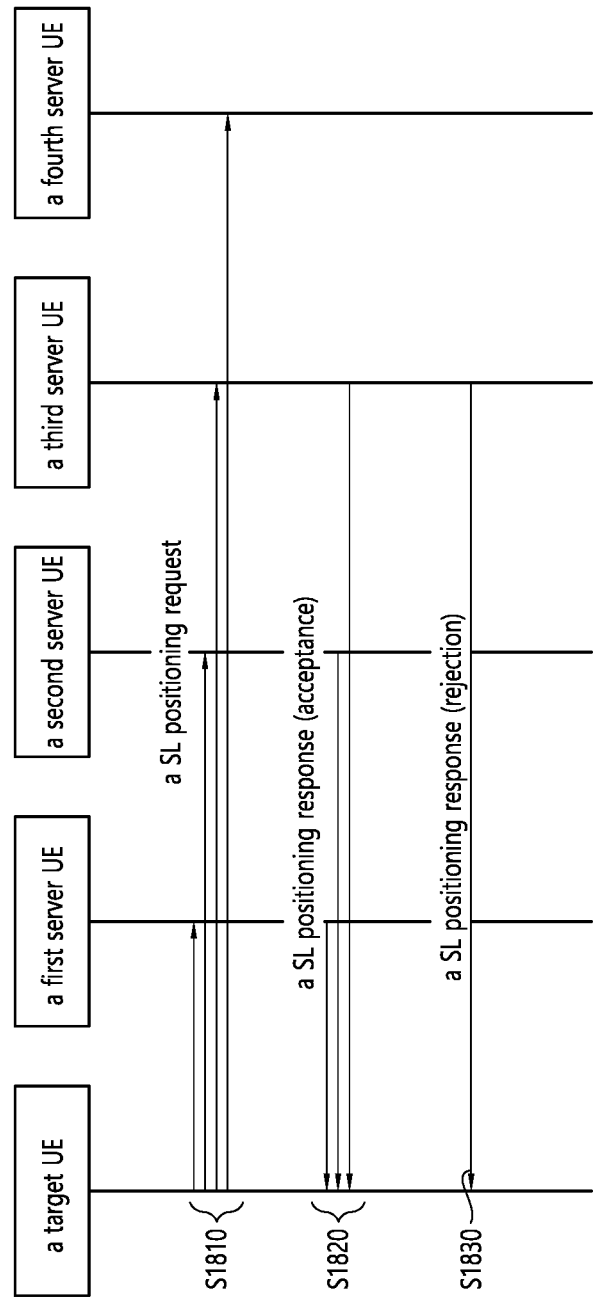
FIG. 18 shows a procedure of an initialization process related to sidelink positioning between a target UE and a server UE in accordance with an embodiment of the present disclosure.

FIG. 18 shows a procedure of an initialization process related to sidelink positioning between a target UE and a server UE in accordance with an embodiment of the present disclosure. The embodiment of FIG. 18 may be combined with various embodiments of the present disclosure.

Referring to FIG. 18, in step S1810, the target UE may transmit a sidelink positioning request to each of the first server UE, the second server UE, the third server UE, and the fourth server UE. For example, the sidelink positioning request may be a request for a server role related to the sidelink positioning of the target UE. For example, the target UE may transmit a message related to the sidelink positioning request to the first server UE, the second server UE, the third server UE, and the fourth server UE. For example, the target UE may request that UEs around the target UE perform a server role. For example, the target UE may transmit a message requesting to perform a server role for sidelink positioning to the first server UE, the second server UE, the third server UE, and the fourth server UE, which are neighboring UEs.

In step S1820, the target UE may receive a response accepting the sidelink positioning from each of the first server UE, the second server UE, and the third server UE. For example, the first server UE, the second server UE and the third server UE may receive a request to serve as a server for sidelink positioning from the target UE. And, the first server UE, the second server UE and the third server may transmit a response accepting the server role for the sidelink positioning to the target UE.

In step S1830, the target UE may receive a response rejecting the sidelink positioning from the fourth server UE. For example, the fourth server UE may receive a request for a server role for sidelink positioning from the target UE, and transmit a response rejecting the server role for sidelink positioning to the target UE.

For example, the UE (e.g., the first server UE, the second server UE, and the third server UE) that finally accepted the request for the server role for the sidelink positioning may operate as a server in the sidelink positioning process of the target UE. As a server, the UE may perform the following processes.

According to an embodiment of the present disclosure, criteria for determining acceptance of the role of the UE as a server may be as follows.

For example, the UE may measure a RSRP for a DM-RS on a PSCCH or a DM-RS on a PSSCH. For example, the DM-RS on the PSCCH or the DM-RS on the PSSCH may include a DM-RS on a PSCCH or a DM-RS on a PSSCH through which the target UE transmits a message related to a sidelink positioning request. For example, if the measured RSRP value is greater than or equal to a threshold value, the UE may accept the server role. For example, if the measured RSRP value is greater than a threshold value, the UE may accept the server role. For example, if the measured RSRP value is less than or equal to a threshold value, the UE may reject the server role. For example, if the measured RSRP value is less than a threshold value, the UE may reject the server role. If the measured RSRP value is less than or equal to a specific value, since a distance between the target UE and the server UE is long, when the server UE participates in sidelink positioning, the accuracy of the positioning measurement of the target UE may be affected. In consideration of the effect on the accuracy of the positioning measurement of the target UE, when the measured RSRP value is less than or equal to a specific value, the UE may reject the server role. For example, the threshold value may be provided by the target UE through positioning. For example, the threshold value may be configured differently according to a location based service (hereinafter referred to as LBS). For example, the threshold value may be pre-configured based on a service. For example, the threshold value may be pre-configured or configured by a base station or a target UE.

For example, the target UE or base station may transmit the LBS related to the sidelink positioning or the QoS related to the LBS to the UE for which the server role is requested by the target UE through a message related to the sidelink positioning request. For example, the UE for which the server role is requested may determine whether to accept/reject the participation in sidelink positioning based on the corresponding LBS or a threshold value required for LBS-related QoS.

For example, the target UE or base station may determine a pre-defined or pre-configured threshold value based on QoS related to the corresponding LBS, etc., and transmit the threshold value to the UE for which the server role is requested by the target UE. For example, the UE for which the server role is requested may determine whether to accept/reject the participation in sidelink positioning based on the threshold value.

For example, the UE for which the server role is requested may determine that the LBS provided to the target UE through the sidelink positioning has no relation to itself or does not need to participate from the viewpoint of its own service. For example, the UE for which the server role is requested may determine that the LBS that the target UE intends to provide through the sidelink positioning has no relation to itself or does not need to participate from the viewpoint of its own service. In this case, the UE for which the server role is requested may reject the server role. Otherwise, the UE for which the server role is requested may accept the server role.

For example, the UE for which the server role is requested may reject the server role when the reliability of location information for the UE is less than or equal to a threshold value. For example, the UE for which the server role is requested may reject the server role when the reliability of location information for the UE is less than a threshold value. For example, the UE for which the server role is requested may accept the server role when the reliability of location information for the UE is greater than or equal to a threshold value. For example, the UE for which the server role is requested may accept the server role when the reliability of location information for the UE is greater than a threshold value. For example, the threshold value related to the reliability of the location information may be configured differently based on the LBS that is provided to the target UE or that the target UE intends to provide through positioning. For example, the threshold value related to the reliability of location information may be pre-configured according to a service. For example, the threshold value related to the reliability of the location information may be pre-configured or configured by the base station or the target UE.

For example, if a priority of a service currently being provided or a priority of a service using resources for the purpose of providing is higher than a priority of a service provided to the target UE through positioning or a priority of a service to be provided by the target UE through positioning, the UE for which the server role is requested may reject the server role. For example, if a priority of a service currently being provided or a priority of a service using resources for the purpose of providing is lower than a priority of a service provided to the target UE through positioning or a priority of a service to be provided by the target UE through positioning, the UE for which the server role is requested may accept the server role. For example, a service targeted by the target UE or a priority of the service may be transmitted through a PSCCH or a PSSCH using a message related to the sidelink positioning request. For example, the target UE may transmit its own service or a priority for its own service to the UE for which the server role is requested through a PSCCH or a PSSCH using a message related to a sidelink positioning request.

For example, the UE for which the server role is requested may accept or reject the server role based on a congestion level of a channel. For example, the UE for which the server role is requested may identify or determine its own channel utilization ratio at the time when the UE receives a request for the server role from the target UE. For example, the UE for which the server role is requested may identify or determine its own channel utilization ratio before or after the time when the UE receives a request for the server role from the target UE. For example, the UE for which the server role is requested may reject the server role when its own channel utilization ratio is equal to or greater than a threshold value. For example, the UE for which the server role is requested may accept the server role when its own channel utilization ratio is equal to or less than a threshold value. For example, the channel utilization ratio may include a channel occupancy ratio related to the UE itself using a channel and a channel busy ratio related to channel usage by other UEs. For example, the threshold value may be configured differently based on the LBS to be provided by the target UE through positioning or being provided to the target UE through positioning. For example, the threshold value related to the reliability of location information may be pre-configured according to a service. For example, the threshold value related to the reliability of the location information may be pre-configured or configured by the base station or the target UE.

Figure 19:
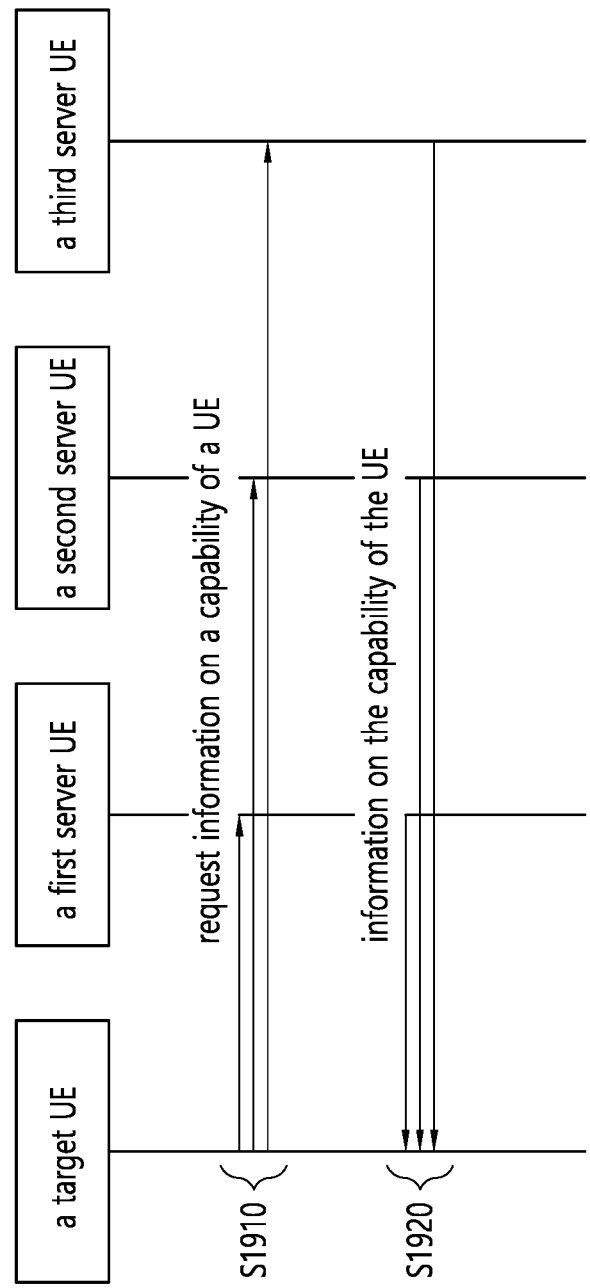
FIG. 19 shows a procedure for a target UE to request information on a capability of a UE related to sidelink positioning from a plurality of server UEs in accordance with an embodiment of the present disclosure

FIG. 19 shows a procedure for a target UE to request information on a capability of a UE related to sidelink positioning from a plurality of server UEs in accordance with an embodiment of the present disclosure. The embodiment of FIG. 19 may be combined with various embodiments of the present disclosure.

Referring to FIG. 19, in step S1910, the target UE may request information on a capability of a UE related to sidelink positioning from the first server UE, the second server UE, and the third UE. For example, the target UE may request information on a capability of a UE related to sidelink positioning from the UE that has accepted the server role. For example, the target UE may transmit information on a capability of the target UE to UEs that have accepted the server role related to sidelink positioning. For example, the target UE may transmit information on a capability of the target UE including at least one of sidelink positioning method that the target UE can perform to the first server UE, the second server UE, and the third server UE, at the same time, the target UE may request the first server UE, the second server UE, and the third server UE to transmit information on a capability of a UE including at least one of sidelink positioning method that each server UE can perform to the target UE. For example, the information on the capability of the UE may include at least one of common element (e.g., whether segmentation or not), whether assistant-GNSS (A-GNSS) based positioning support and parameters related to A-GNSS based positioning, whether sidelink-time difference of arrival (S-TDOA) based positioning support and parameters related to S-TDOA based positioning, whether road side unit-ID (RSU-ID) based positioning support and parameters related to RSU-ID based positioning, whether sensor based positioning support is supported, and parameters related to sensor based positioning, whether terrestrial beacon systems (TBS) based positioning support and parameters related to TBS based positioning, whether WLAN based positioning support and parameters related to WLAN based positioning, or whether Bluetooth (BT) based positioning support and parameters related to BT based positioning. For example, parameters related to S-TDOA-based positioning may include at least one of a S-TDOA type, a supported band, whether inter frequency S-TDOA support, additional Server info list, positioning reference signal (PRS)-ID, whether muting support, PRS configuration (e.g., comb-type, bandwidth (BW), frequency shift, periodicity, repetitions), max supported PRS bandwidth, max reporting interval, whether multiple PRS support, whether idle state measurement support, the number of RX antennas, or whether motion measurement support. For example, the target UE may transmit a transmission message including information on a capability of its own UE to the server UE.

In step S1920, the target UE may receive information on the capability of the UE related to sidelink positioning from the first server UE, the second server UE, and the third server UE. For example, the target UE may determine parameters required for the sidelink positioning method and/or PRS transmission based on the information on the capability of the UE related to the sidelink positioning received from each server UE. For example, the server UE may transmit a transmission message including information on the capability of its own UE to the target UE.

Figure 20:
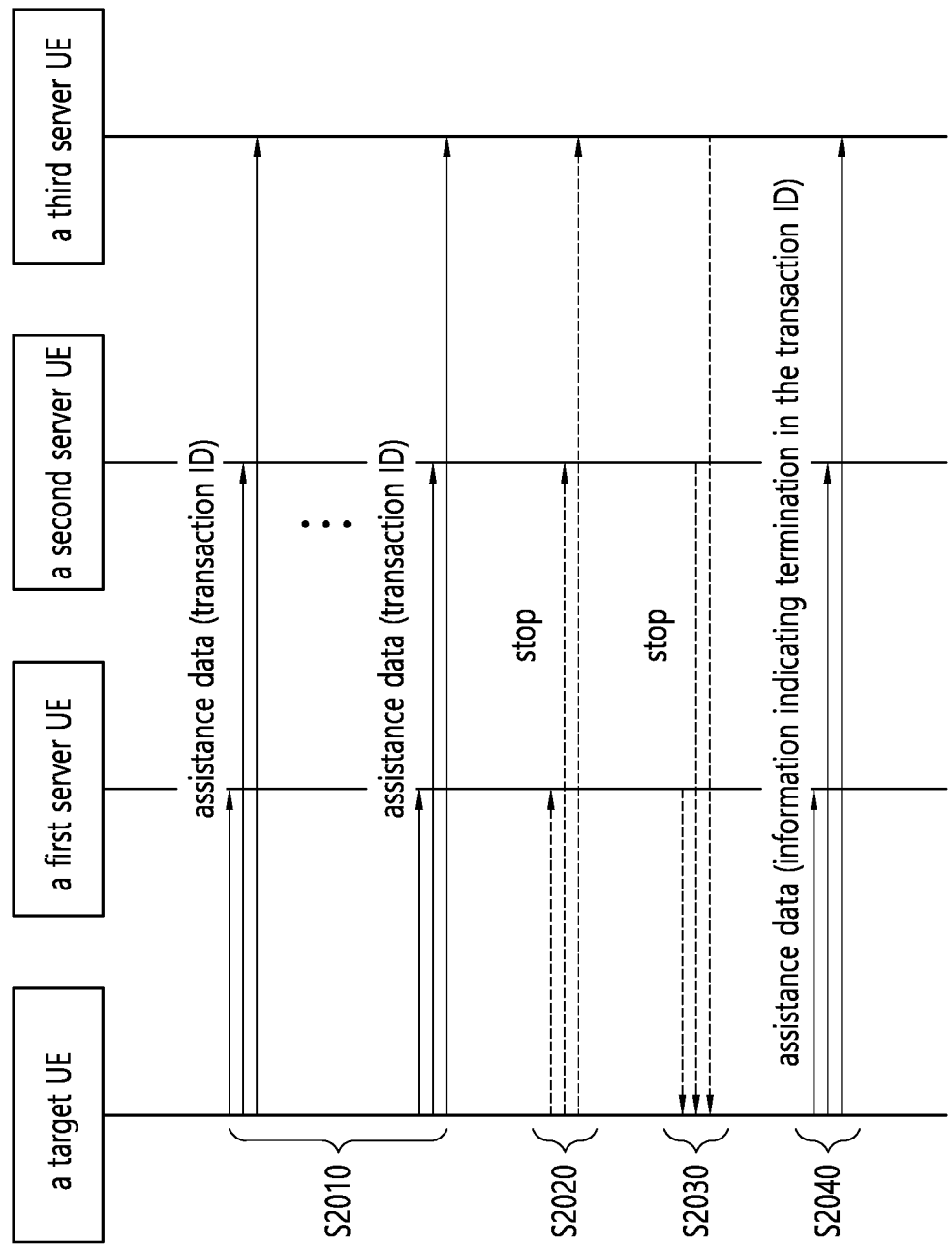
FIG. 20 shows a procedure in which a target UE transmits assistance data related to sidelink positioning to a plurality of server UEs in accordance with an embodiment of the present disclosure.

FIG. 20 shows a procedure in which a target UE transmits assistance data related to sidelink positioning to a plurality of server UEs in accordance with an embodiment of the present disclosure. The embodiment of FIG. 20 may be combined with various embodiments of the present disclosure.

Referring to FIG. 20, in step S2010, the target UE may provide assistance data to the first server UE, the second server UE, and the third server UE. For example, the target UE may determine assistance data based on information on a capability of a UE received from each server UE. For example, the target UE may transmit assistance data to the each server UE. For example, the target UE may divide assistance data into a plurality of pieces through a sidelink positioning protocol message, and the target UE may transmit the assistance data to each server UE. For example, the target UE may repeatedly transmit assistance data through a sidelink positioning protocol message. For example, the sidelink positioning protocol message may include a transaction ID. For example, the UE may confirm that the message is related to one sidelink method through the transaction ID included in each sidelink positioning protocol message. For example, the UE may determine one sidelink method related to the message through the transaction ID included in each sidelink positioning protocol message. For example, each sidelink positioning protocol message may be distinguished as to which sidelink method the message is related to through a transaction ID. For example, the assistance data may include parameters related to S-TDOA-based positioning. For example, parameters related to S-TDOA-based positioning may include at least one of a S-TDOA type, a frequency band, inter frequency S-TDOA configuration, additional Server info list, positioning reference signal (PRS)-ID, muting configuration, PRS configuration (e.g., comb-type, bandwidth (BW), frequency shift, periodicity, repetitions), max reporting interval, max supported PRS bandwidth, multiple PRS configuration, idle state measurement configuration, the number of RX antennas, or motion measurement configuration.

In step S2020, the target UE may transmit a stop message to the first server UE, the second server UE, and the third server UE. In step S2030, the target UE may receive a stop message from the first server UE, the second server UE, and the third server UE. For example, the UE may stop the transmission of the assistance data by transmitting the stop message. Steps S2020 and S2030 may be selectively applied and may be omitted.

In step S2040, the target UE may provide the assistance data to the first server UE, the second server UE, and the third server UE. For example, when the target UE last transmits a sidelink positioning protocol message for providing assistance data, the transmission of assistance data may be terminated by including information indicating termination in the corresponding transaction ID. For example, when the target UE last transmits a sidelink positioning protocol message for providing assistance data, the transmission of assistance data may be terminated by including information related to the termination in the sidelink positioning protocol message. For example, the last transmitted sidelink positioning protocol message may include information on a termination related to the assistance data transmission.

Figure 21:
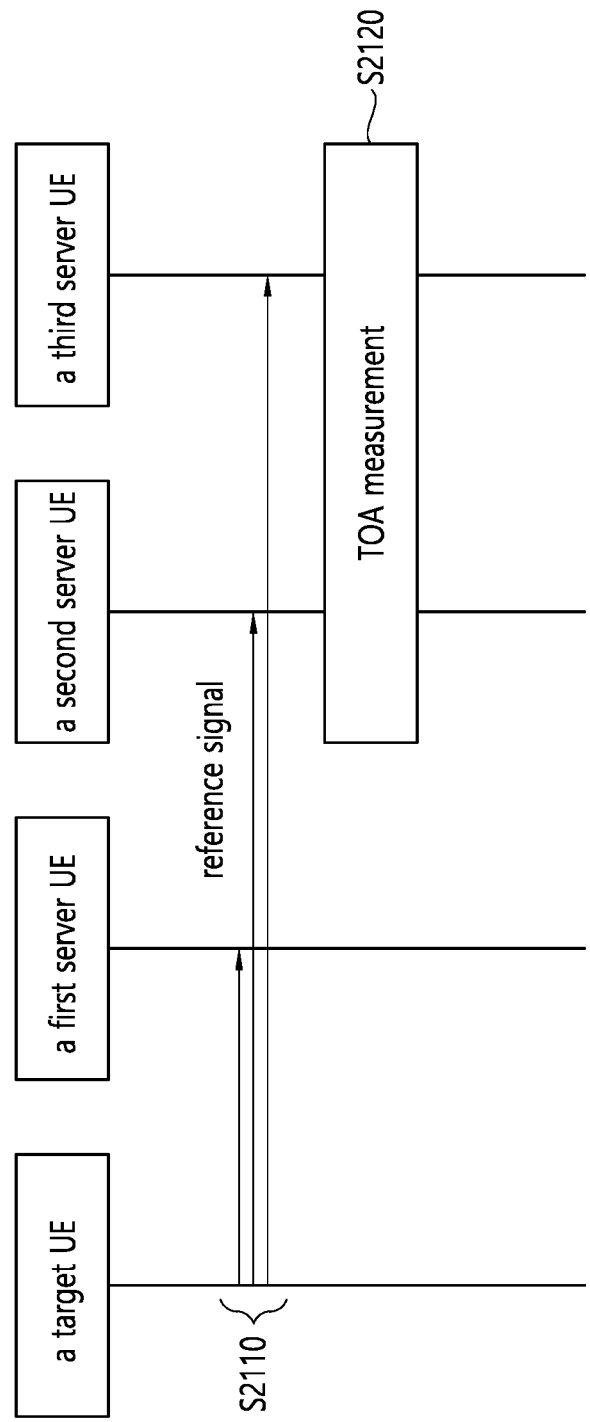
FIG. 21 shows a procedure in which a plurality of server UEs transmit at least one PRS to a target UE in accordance with an embodiment of the present disclosure.

FIG. 21 shows a procedure in which a plurality of server UEs transmit at least one PRS to a target UE in accordance with an embodiment of the present disclosure. The embodiment of FIG. 21 may be combined with various embodiments of the present disclosure.

Referring to FIG. 21, in step S2110, the first server UE, the second server UE, and the third server UE may receive at least one reference signal from the target UE. For example, the first server UE, the second server UE, and the third server UE may receive least one PRS from the target UE based on the assistance data. For example, the first server UE, the second server UE, and the third server UE may receive at least one PRS from the target UE based on parameters configured for the target UE.

In step S2120, each server UE may measure TOA based on the at least one PRS received from the target UE. For example, the first server UE, the second server UE, and the third server UE may measure the TOA based on the at least one PRS received from the target UE.

For example, the at least one PRS may be independently transmitted (stand-alone (hereinafter, SA)) regardless of a sidelink channel or data transmission. For example, the at least one PRS may be transmitted (non-stand-alone (hereinafter, NSA)) in related to any one of S-SSB, PSCCH and PSSCH. For example, for SA PRS transmission, parameters related to transmission of the PRS may be transmitted from the target UE to each server UE through an assistance data transmission process in advance. For example, the target UE may perform blind detection to receive the PRS. Alternatively, for example, the target UE may perform detection in a pre-configured time domain and/or a pre-configured frequency domain to receive the PRS. For example, in the case of SA transmission, the target UE may transmit parameters related to PRS transmission to each server UE through the assistance data transmission process of FIG. 20 described above.

For example, for NSA PRS transmission, PRS transmission may be transmitted in related to a S-SSB, a PSCCH or a PSSCH transmission transmitted by each server UE. For example, whether a TOA feedback is requested and whether a PRS is transmitted on a PSCCH may be signaled. For example, a higher layer or network may signal whether to transmit a PRS on a PSCCH and whether to request a TOA feedback to a target UE or a server UE. For example, the PRS may be transmitted in a multiplexed form with a PSCCH by being included in a region in which a PSSCH is transmitted. For example, by including the PRS in a region in which a PSSCH is transmitted among the regions in which the PSSCH region and a PSCCH region are performed FDM, the PRS may be transmitted in a form in which the PSCCH and the PRS are multiplexed. For example, the PRS may be transmitted through resources having a different time/frequency domain from a PSSCH transmission region. For example, the PRS may be transmitted through a last symbol of a slot for sidelink transmission. For example, the last symbol may be a symbol used for a PSFCH transmission. For example, after decoding a PSCCH, the target UE may check whether the PRS has been transmitted and detect the PRS through blind detection. For example, the target UE receiving the PRS may decode a received PSCCH, and determine whether the PSR has been transmitted, and detect the PRS through blind detection. For example, the server UE may receive the PRS by detecting the PRS through blind detection.

Figure 22:
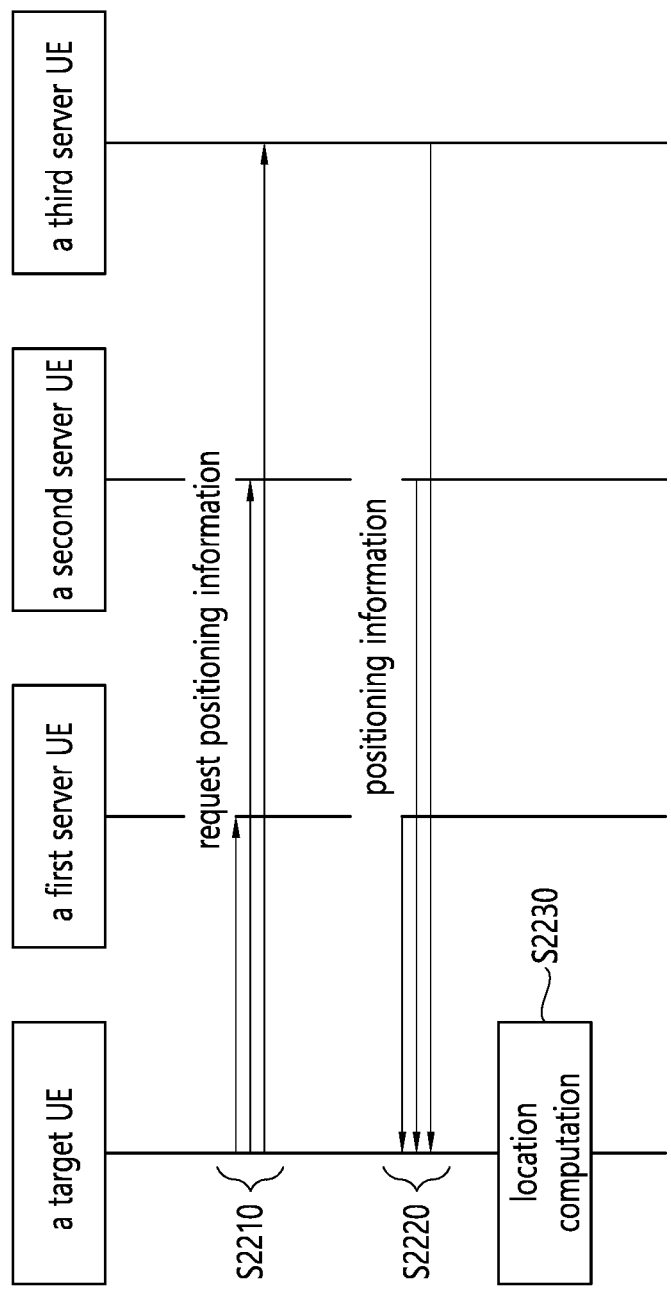
FIG. 22 shows a procedure for estimating a location of a target UE based on TOA values received by a target UE from each server UE in accordance with an embodiment of the present disclosure.

FIG. 22 shows a procedure for estimating a location of a target UE based on TOA values received by a target UE from each server UE in accordance with an embodiment of the present disclosure. The embodiment of FIG. 22 may be combined with various embodiments of the present disclosure.

Referring to FIG. 22, in step S2210, the target UE may request positioning information from the first server UE, the second server UE, and the third server UE. For example, the positioning information may include at least one of a location of a server UE or information related to a TOA. For example, the information related to the TOA may include at least one of a system frame number, a server ID, frequency information, a TOA measurement quality, or a neighbor measurement information list. For example, the target UE may request the first server UE, the second server UE, and the third server UE to transmit a TOA value measured by each server UE to the target UE.

In step S2220, the target UE may receive positioning information from the first server UE, the second server UE, and the third server UE. For example, after the server UE receives a request message for positioning information from the target UE or after the server UE receives a PSCCH related to requesting positioning information from the target UE, the server UE may perform feedback the TOA value to the target terminal at the earliest point in time at which the channel can be accessed through channel sensing after a specific time has elapsed. For example, the specific time may be a time in consideration of a time required for a processing operation including the TOA measurement of the server UE. For example, the specific time may be configured based on a time required for a processing operation including the TOA measurement of the server UE. For example, the server UE may feedback the TOA value to the target UE through a message for providing positioning information at the earliest point in time when the channel can be accessed through channel sensing after the specific time has elapsed.

For example, since a channel busy state of the server UE continues for a long time, when a time at which the server UE can feedback a TOA has elapsed more than a specific threshold value after a time of receiving a request message for positioning information from a target UE, the server UE may determine that the TOA measurement is no longer valid because the location change between the target UE and the server UE is very large. The server UE may cancel transmission of the TOA value and request the target UE to retransmit the PRS. For example, after a time point at which a request message for positioning information is received from the target UE, when a time at which the server UE can feedback a TOA has elapsed more than a threshold value, the server UE may cancel transmission of the TOA value and request the target UE to retransmit the PRS. For example, when the target UE retransmits the PRS, all server UEs participating in the sidelink positioning may perform TOA measurement again based on the retransmitted PRS, and may feedback the TOA value to the target UE. For example, the threshold value may be configured differently based on the LBS. For example, the LBS may include a LBS to be provided by the target UE through positioning or a LBS being provided to the target UE through positioning. For example, the threshold value may be pre-configured based on a service. For example, the threshold value may be pre-configured or configured by a base station or a target UE.

For example, based on the embodiment of FIGS. 18 to 22 described above, the target UE or the base station may transmit a LBS related to the sidelink positioning or a QoS related to the LBS to the server UE through a message transmitted from the target UE to the server UE. For example, the server UE may determine a threshold value based on the corresponding LBS or QoS related to the LBS. For example, the target UE or base station may determine a predefined or pre-configured threshold value based on a QoS related to the corresponding LBS, and may transmit the determined threshold value to the server UE.

In step S2230, the target UE may calculate or determine a location of the target UE based on the positioning information. For example, the target UE may calculate a difference between TOA values received from each server UE. For example, the target UE may estimate or determine a location of the target UE by using a hyperbola based on a reference signal time difference (RSTD) together with a location of each server terminal. For example, it may be assumed that the location of the server UE is known to the target UE. For example, the server UE may be a UE having a fixed location, such as a road side unit (RSU). For example, the server UE may be a mobile UE in which the target UE knows the location of the server UE by various methods.

For example, the target UE may estimate or determine a location of the target UE by using the time difference (RSTD) of the TOA or the time sum of the TOA. For example, when the target UE uses the time difference of TOA values, the target UE may draw a hyperbola focusing on the positions of the two server UEs based on a difference between the two TOA values received from a pair of server UEs, and draw another hyperbola from another pair of TOA values. After, the target UE may obtain an intersection of two hyperbola. For example, the target UE may estimate or determine the coordinates of the intersection of the two hyperbolas as a location of the target UE.

For example, when the target UE uses the time sum of TOA, the target UE may draw an ellipse focusing on the positions of the two server UEs based on the sum of the two TOA values received from a pair of server UEs, and draw another ellipse from another pair of TOA values. After, the target UE may obtain the intersection of the two ellipses. For example, the target UE may estimate or determine the coordinates of the intersection of the two ellipses as a location of the target UE.

For example, based on the TOA received by the target UE, in a method of estimating a location of the target UE from an intersection of hyperbola and a method of estimating a location of the target UE from an intersection of an ellipses, an accuracy of location estimation may increase as multiple pairs of TOAs are received. For example, the target UE may improve positioning accuracy by mixing and using a location estimation method based on a hyperbola and an ellipse.

The present disclosure proposes a method for estimating the location of a UE only through communication between sidelink UEs without the aid of a base station, an MME, or an LCS server, and a procedure necessary therefor. In the present disclosure, the time interval (TOA) of each of the target UE and the server UEs is estimated based on the PRS transmitted to a plurality of UEs (Server) in the vicinity from one UE (Target), and through this, a method for estimating the location of a target UE is proposed using the difference or sum of the TOAs.

The present disclosure compares the existing method of estimating the location of the UE based on the LCS server, by reducing the time required for communication between network entities, such as a base station, an MME, and an LCS server, through the Uu link, the location of the UE can be estimated within a short time. In contrast to the existing method of estimating the location of the UE based on the LCS server, the present disclosure can reduce the time required for communication between network entities such as a base station, MME, and LCS server through a Uu link, and estimate the location of the UE within a short time. In addition, although the existing method has a constraint that it must be connected to the LCS server through the Uu link with the base station, since the base station is not required, even when the UE is located outside the coverage of the base station, the present disclosure can efficiently estimate the location of the UE. In this way, by estimating the location without a short time delay and space limitation, the UE can efficiently provide a location estimation service in V2X communication and IoT service.

In addition, compared with a method in which a plurality of server UEs transmit a PRS to a single target UE to perform sidelink positioning, the present disclosure can reduce the complexity in which a plurality of server UEs must orthogonally multiplex a resource for transmitting the PRS.

Figure 23:
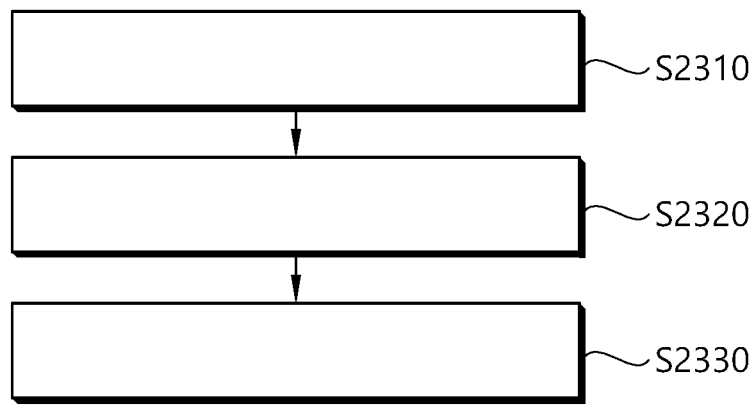
FIG. 23 shows a method for a first device to determine a location based on location information and TOA values of a plurality of second devices in accordance with an embodiment of the present disclosure.

FIG. 23 shows a method for a first device to determine a location based on location information and TOA values of a plurality of second devices in accordance with an embodiment of the present disclosure. The embodiment of FIG. 23 may be combined with various embodiments of the present disclosure.

Referring to FIG. 23, in step S2310, the first device 100 may transmit, to a plurality of second devices 200, at least one positioning reference signal (PRS). For example, the at least one PRS may be transmitted through any one of at least one S-SSB, at least one PSCCH or at least one PSSCH.

In step S2320, the first device 100 may receive, from the plurality of second devices 200, location information of the plurality of second devices 200 and time of arrival (TOA) values of the plurality of second devices 200. For example, the TOA values may be determined based on the time when the plurality of second devices 200 received the at least one PRS. For example, retransmission for the at least one PRS may be requested from the plurality of second devices 200 to the first device 100, based on the TOA values not transmitted from the plurality of second devices 200 to the first device 100 within a pre-configured time. For example, the pre-configured time may be determined based on services related to the plurality of second devices 200.

In step S2330, the first device 100 may determine a location of the first device 100 based on the location information of the plurality of second UEs 200 and the TOA values of the plurality of second devices 200. For example, the location of the first device 100 may be determined based on the location information of the second device 200 and at least one of a difference between the TOA values of the plurality of second devices 200 or a sum of the TOA values of the plurality of second devices 200.

For example, the first device 100 may transmit a message requesting sidelink positioning to a plurality of devices. For example, the first device 100 may receive at least one message accepting the sidelink positioning from the plurality of second devices 200 among the plurality of devices. For example, the plurality of second devices 200 may include, at least one of a second device 200 in which a reference signal received power (RSRP) value measured based on a demodulation reference signal (DM-RS) on a physical sidelink control channel (PSCCH) or a DM-RS on a physical sidelink shared channel (PSSCH) through which the message requesting sidelink positioning is transmitted is greater than or equal to a pre-configured threshold value, a second device 200 in which a reliability related to a location information of the second device 200 is greater than or equal to a pre-configured threshold value, a second device 200 having a channel busy ratio of the second device 200 related to time when the message requesting sidelink positioning is received from the first device 100 is lower than a pre-configured threshold value, or a second device 200 having a channel occupancy ratio of the second device 200 related to time when the message requesting sidelink positioning is received from the first device 100 is lower than a pre-configured threshold value. For example, the pre-configured threshold value may be determined differently based on a service related to sidelink positioning of the first device 100. For example, the pre-configured threshold value is configured by a base station or the first device 100. For example, the message requesting the sidelink positioning may include priority information of a service related to the first device 100. For example, the plurality of second devices 200 may include a second device 200 in which a priority of a service related to the second device 200 is lower than a priority of a service related to the first device 100.

For example, the first device 100 may transmit a message requesting the plurality of second devices 200 to transmit information related to capability of a second device 200. For example, the first device 100 may receive the information related to the capability of the second device 200 from the plurality of second devices 200. For example, the message requesting the plurality of second devices 200 to transmit information related to the capability of the second device 200 may include information related to capability of the first device 100. For example, the information related to the capability of the device may include at least one of common element (e.g., whether segmentation or not), whether assistant-GNSS (A-GNSS) based positioning support and parameters related to A-GNSS based positioning, whether sidelink-time difference of arrival (S-TDOA) based positioning support and parameters related to S-TDOA based positioning, whether road side unit-ID (RSU-ID) based positioning support and parameters related to RSU-ID based positioning, whether sensor based positioning support is supported, and parameters related to sensor based positioning, whether terrestrial beacon systems (TBS) based positioning support and parameters related to TBS based positioning, whether WLAN based positioning support and parameters related to WLAN based positioning, or whether Bluetooth (BT) based positioning support and parameters related to BT based positioning. For example, parameters related to S-TDOA-based positioning may include at least one of a S-TDOA type, a supported band, whether inter frequency S-TDOA support, additional Server info list, positioning reference signal (PRS)-ID, whether muting support, PRS configuration (e.g., comb-type, bandwidth (BW), frequency shift, periodicity, repetitions), max supported PRS bandwidth, max reporting interval, whether multiple PRS support, whether idle state measurement support, the number of RX antennas, or whether motion measurement support.

For example, the first device 100 may determine a sidelink positioning method of the first device 100 and a parameter for transmitting the at least one PRS based on the information related to the capability of the second device 200. For example, the sidelink positioning method may include at least one of A-GNSS based positioning, S-TDOA based positioning, RSU-ID based positioning, sensor based positioning, TBS based positioning, WLAN based positioning, BT based positioning. For example, the parameter for transmitting the at least one PRS may include at least one of S-TDOA type, frequency band, S-TDOA between frequencies, additional server information, PRS-ID, muting, comb-type, bandwidth (BW), a parameter related to frequency shift, periodicity, repetitions, max supported PRS bandwidth, max reporting interval, a parameter related to whether or not there are multiple PRSs, a parameter related to whether the idle state is measured, a parameter related to the number of RX antennas or parameter related to whether to measure motion. For example, the first terminal 100 may determine a type of parameter for transmitting the PRS.

For example, the first device 100 may determine assistance data based on the information related to the capability of the second device 200. For example, the first device 100 may transmit, to the plurality of second devices 200, at least one sidelink positioning protocol message including the assistance data. For example, the at least one sidelink positioning protocol message may represent the sidelink positioning method by a transaction ID. For example, the assistance data may be divided and transmitted to the plurality of second devices 200. For example, a last transmitted sidelink positioning protocol message may include information related to an end for the transaction ID. For example, the second device 200 may terminate a procedure for receiving the assistance data based on the information related to end of the transaction ID. For example, the at least one PRS is transmitted to the plurality of second devices 200 based on the assistance data. For example, the assistance data may include parameters related to S-TDOA-based positioning. For example, parameters related to S-TDOA-based positioning may include at least one of a S-TDOA type, a frequency band, inter frequency S-TDOA configuration, additional Server info list, positioning reference signal (PRS)-ID, muting configuration, PRS configuration (e.g., comb-type, bandwidth (BW), frequency shift, periodicity, repetitions), max reporting interval, max supported PRS bandwidth, multiple PRS configuration, idle state measurement configuration, the number of RX antennas, or motion measurement configuration.

The above-described embodiment may be applied to various devices to be described below. First, for example, the processor 102 of the first device 100 may control the transceiver 106 to transmit, to a plurality of second devices 200, at least one positioning reference signal (PRS). And, for example, the processor 102 of the first device 100 may control the transceiver 106 to receive, from the plurality of second devices 200, location information of the plurality of second devices 200 and time of arrival (TOA) values of the plurality of second devices 200. And, for example, the processor 102 of the first device 100 may determine a location of the first device 100 based on the location information of the plurality of second UEs 200 and the TOA values of the plurality of second devices 200.

According to an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: transmit, to a plurality of second devices, at least one positioning reference signal (PRS), receive, from the plurality of second devices, location information of the plurality of second devices and time of arrival (TOA) values of the plurality of second devices, and determine a location of the first device based on the location information of the plurality of second devices and the TOA values of the plurality of second devices. For example, the TOA values are determined based on the time when the plurality of second devices received the at least one PRS.

According to an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: transmit, to a plurality of second UEs, at least one positioning reference signal (PRS), receive, from the plurality of second UEs, location information of the plurality of second devices and time of arrival (TOA) values of the plurality of second UEs, and determine a location of the first device based on the location information of the plurality of second UEs and the TOA values of the plurality of second UEs. For example, the TOA values are determined based on the time when the plurality of second UEs received the at least one PRS.

According to an embodiment of the present disclosure, a non-transitory computer-readable storage medium storing instructions may be provided. For example, the instructions, when executed, cause a first device to: transmit, to a plurality of second devices, at least one positioning reference signal (PRS), receive, from the plurality of second devices, location information of the plurality of second devices and time of arrival (TOA) values of the plurality of second devices, determine, a location of the first device based on the location information of the plurality of second devices and the TOA values of the plurality of second devices. For example, the TOA values are determined based on the time when the plurality of second devices received the at least one PRS.

Figure 24:
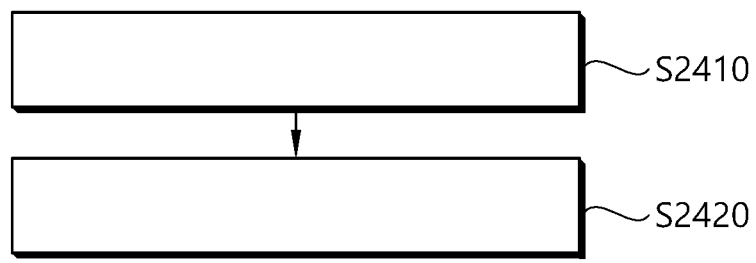
FIG. 24 shows a method in which a second device 200 transmits location information and a TOA value to a first device 100 in accordance with an embodiment of the present disclosure.

FIG. 24 shows a method in which a second device 200 transmits location information and a TOA value to a first device 100 in accordance with an embodiment of the present disclosure. The embodiment of FIG. 24 may be combined with various embodiments of the present disclosure.

Referring to FIG. 24, in step S2410, the second device 200 may receive a positioning reference signal (PRS) from a first device 100. For example, the second device 200 may receive a message requesting sidelink positioning from the first device 100. For example, before receiving the PRS from the first device 100, the second device 200 may receive a message requesting sidelink positioning from the first device 100. For example, the second device 200 may transmit a message for accepting the sidelink positioning to the first device 100.

For example, the second device 200 may include, at least one of a second device 200 in which a reference signal received power (RSRP) value measured based on a demodulation reference signal (DM-RS) on a physical sidelink control channel (PSCCH) or a DM-RS on a physical sidelink shared channel (PSSCH) through which the message requesting sidelink positioning is transmitted is greater than or equal to a pre-configured threshold value, a second device 200 in which a reliability related to a location information of the second device 200 is greater than or equal to a pre-configured threshold value, a second device 200 having a channel busy ratio of the second device 200 related to time when the message requesting sidelink positioning is received from the first device 100 is lower than a pre-configured threshold value, or a second device 200 having a channel occupancy ratio of the second device 200 related to time when the message requesting sidelink positioning is received from the first device 100 is lower than a pre-configured threshold value. For example, the pre-configured threshold value may be determined differently based on a service related to sidelink positioning of the first device 100. For example, the pre-configured threshold value is configured by a base station or the first device 100. For example, the message requesting the sidelink positioning may include priority information of a service related to the first device 100. For example, the second device 200 may include a second device 200 in which a priority of a service related to the second device 200 is lower than a priority of a service related to the first device 100.

In step S2420, the second device 200 may transmit location information of the second device 200 and a time of arrival (TOA) value of the second device 200 to the first device 100. For example, a location of the first device may be determined based on the location information of the second device and the TOA value of the second device. For example, the TOA value may be determined based on time when the second device 200 receives the PRS. For example, when the second device 200 does not transmit the TOA value to the first device 100 within a pre-configured time, the second device 200 may request the first device 100 to retransmit the PRS. For example, the pre-configured time may be determined based on a service related to the second device 200.

The above-described embodiment may be applied to various devices to be described below. First, for example, the processor 202 of the second device 200 may control the transceiver 206 to receive a positioning reference signal (PRS) from a first device 100. And, for example, the processor 202 of the second device 200 may control the transceiver 206 to transmit location information of the second device 200 and a time of arrival (TOA) value of the second device 200 to the first device 100.

According to an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: receive a positioning reference signal (PRS) from a first device, transmit location information of the second device and a time of arrival (TOA) value of the second device to the first device. For example, a location of the first device is determined based on the location information of the second device and the TOA value of the second device. For example, the TOA value is determined based on time when the second device receives the PRS.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 25:
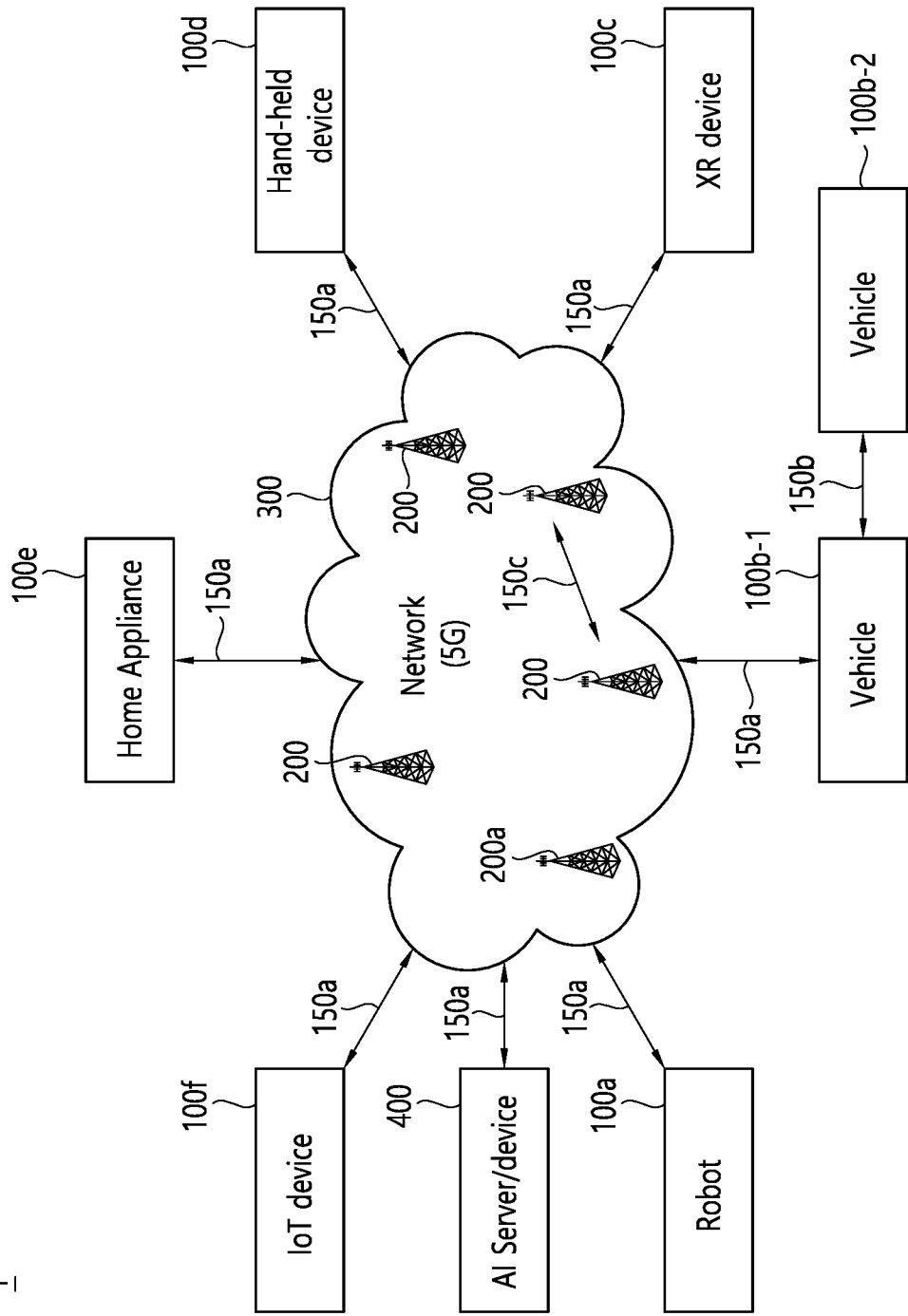
FIG. 25 shows a communication system 1, in accordance with an embodiment of the present disclosure.

FIG. 25 shows a communication system 1, in accordance with an embodiment of the present disclosure.

Referring to FIG. 25, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smart-pad, a wearable device (e.g., a smartwatch or a smart-glasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 26:
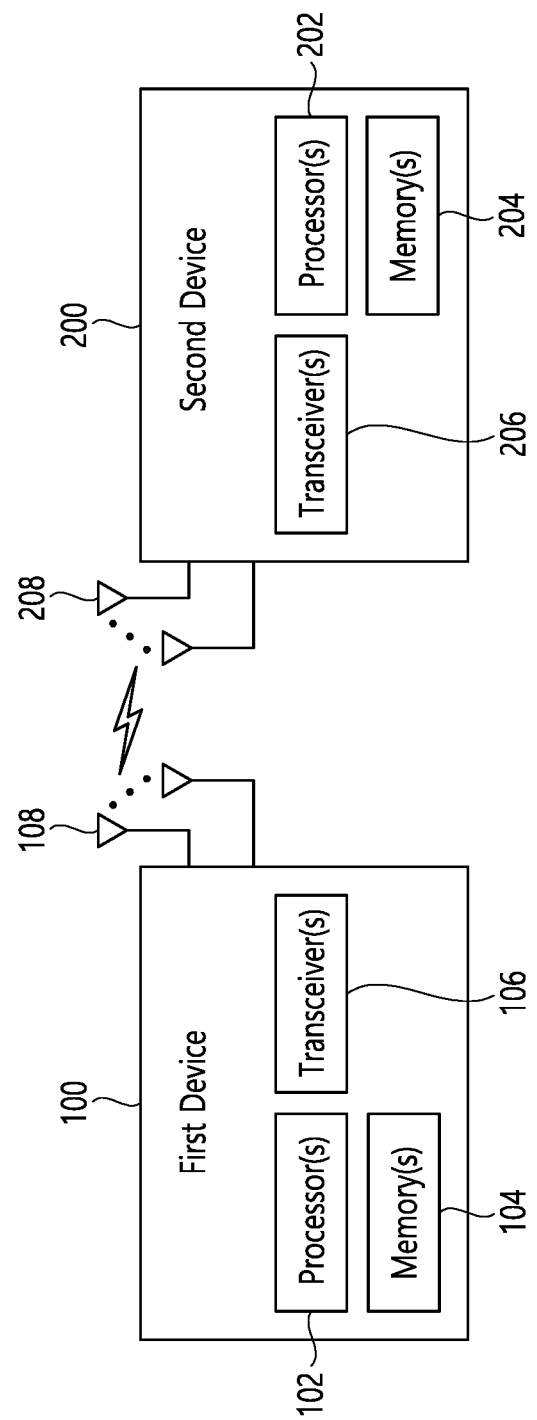
FIG. 26 shows wireless devices, in accordance with an embodiment of the present disclosure.

FIG. 26 shows wireless devices, in accordance with an embodiment of the present disclosure.

Referring to FIG. 26, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 25.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 27:
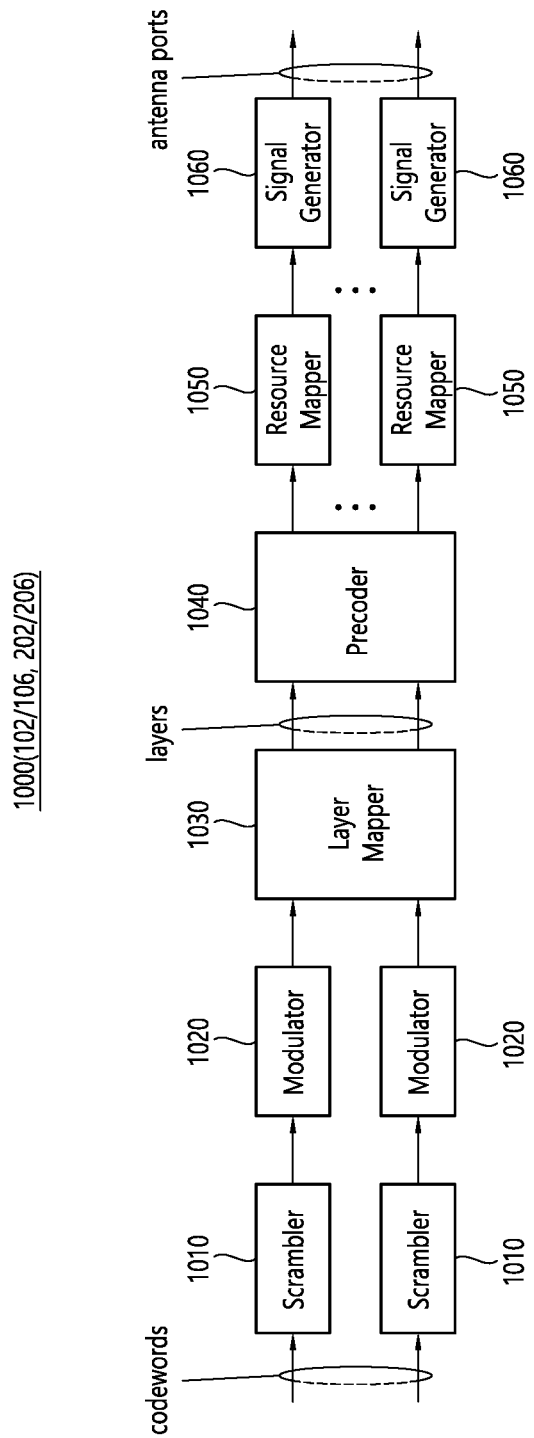
FIG. 27 shows a signal process circuit for a transmission signal, in accordance with an embodiment of the present disclosure.

FIG. 27 shows a signal process circuit for a transmission signal, in accordance with an embodiment of the present disclosure.

Referring to FIG. 27, a signal processing circuit 1000 may include scramblers 1010, modulators 1020, a layer mapper 1030, a precoder 1040, resource mappers 1050, and signal generators 1060. An operation/function of FIG. 27 may be performed, without being limited to, the processors 102 and 202 and/or the transceivers 106 and 206 of FIG. 26. Hardware elements of FIG. 27 may be implemented by the processors 102 and 202 and/or the transceivers 106 and 206 of FIG. 26. For example, blocks 1010 to 1060 may be implemented by the processors 102 and 202 of FIG. 26. Alternatively, the blocks 1010 to 1050 may be implemented by the processors 102 and 202 of FIG. 26 and the block 1060 may be implemented by the transceivers 106 and 206 of FIG. 26.

Codewords may be converted into radio signals via the signal processing circuit 1000 of FIG. 27. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 27. For example, the wireless devices (e.g., 100 and 200 of FIG. 26) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 28:
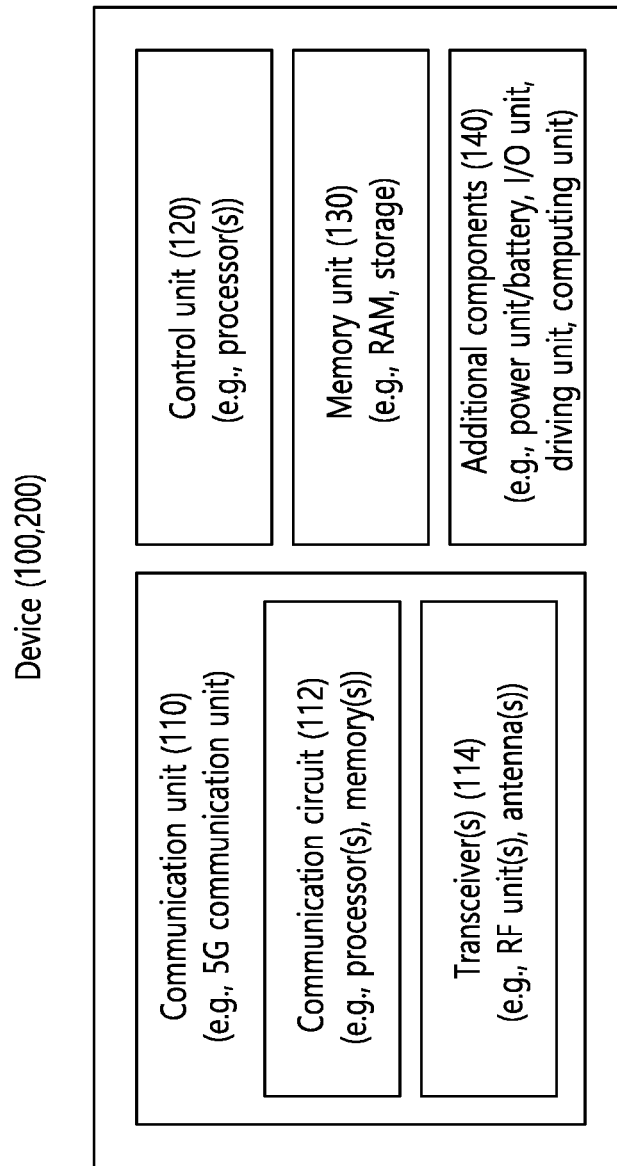
FIG. 28 shows a wireless device, in accordance with an embodiment of the present disclosure.

FIG. 28 shows another example of a wireless device, in accordance with an embodiment of the present disclosure. The wireless device may be implemented in various forms according to a use-case/service (refer to FIG. 25).

Referring to FIG. 28, wireless devices 100 and 200 may correspond to the wireless devices 100 and 200 of FIG. 26 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 26. For example, the transceiver(s) 114 may include the one or more transceivers 106 and 206 and/or the one or more antennas 108 and 208 of FIG. 26. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 25), the vehicles (100b-1 and 100b-2 of FIG. 25), the XR device (100c of FIG. 25), the hand-held device (100d of FIG. 25), the home appliance (100e of FIG. 25), the IoT device (100f of FIG. 25), a digital broadcast terminal, a hologram device, a public safety device, an MTC device, a medicine device, a fintech device (or a finance device), a security device, a climate/environment device, the AI server/device (400 of FIG. 25), the BSs (200 of FIG. 25), a network node, etc. The wireless device may be used in a mobile or fixed place according to a use-example/service.

In FIG. 28, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 28 will be described in detail with reference to the drawings.

Figure 29:
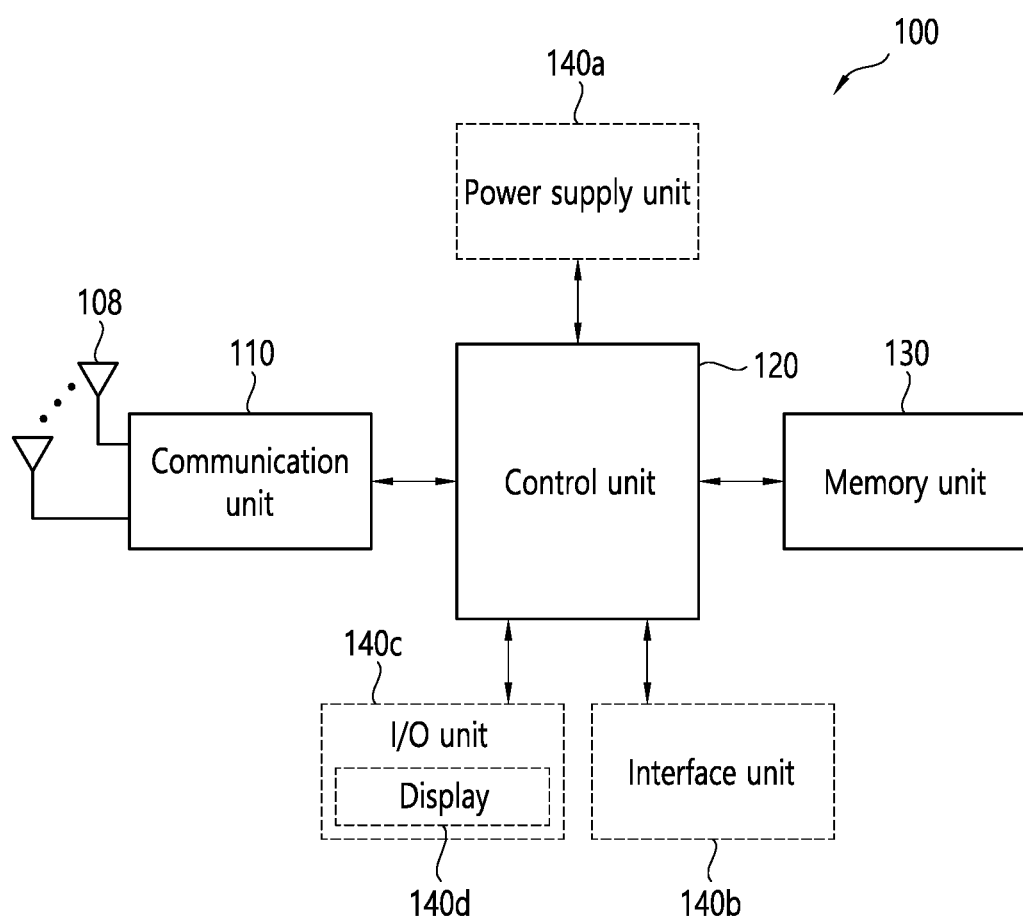
FIG. 29 shows a hand-held device, in accordance with an embodiment of the present disclosure.

FIG. 29 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 29, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 28, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

FIG. 30 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 30, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 28, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
    transmitting, to a plurality of second devices, at least one positioning reference signal (PRS);
    receiving, from the plurality of second devices, location information of the plurality of second devices and time of arrival (TOA) values of the plurality of second devices; and
    determining a location of the first device based on the location information of the plurality of second UEs and the TOA values of the plurality of second devices,
    wherein the TOA values are determined based on the time when the plurality of second devices received the at least one PRS.

2. The method of claim 1, further comprising:
    transmitting a message requesting sidelink positioning to a plurality of devices; and
    receiving at least one message accepting the sidelink positioning from the plurality of second devices among the plurality of devices.

3. The method of claim 2, wherein the plurality of second devices include at least one of a second device in which a reference signal received power (RSRP) value measured based on a demodulation reference signal (DM-RS) on a physical sidelink control channel (PSCCH) or a DM-RS on a physical sidelink shared channel (PS SCH) through which the message requesting sidelink positioning is transmitted is greater than or equal to a pre-configured threshold value, a second device in which a reliability related to a location information of the second device is greater than or equal to a pre-configured threshold value, a second device having a channel busy ratio of the second device related to time when the message requesting sidelink positioning is received from the first device is lower than a pre-configured threshold value, or a second device having a channel occupancy ratio of the second device related to time when the message requesting sidelink positioning is received from the first device is lower than a pre-configured threshold value.

4. The method of claim 3, wherein the pre-configured threshold value is determined differently based on a service related to sidelink positioning of the first device.

5. The method of claim 3, wherein the pre-configured threshold value is configured by a base station or the first device.

6. The method of claim 2, wherein retransmission for the at least one PRS is requested from the plurality of second devices to the first device, based on the TOA values not transmitted from the plurality of second devices to the first device within a pre-configured time, and
wherein the pre-configured time is determined based on services related to the plurality of second devices.

7. The method of claim 1, further comprising:
transmitting a message requesting the plurality of second devices to transmit information related to capability of a second device; and
receiving the information related to the capability of the second device from the plurality of second devices,
wherein the message requesting the plurality of second devices to transmit information related to the capability of the second device includes information related to capability of the first device.

8. The method of claim 7, further comprising:
determining a sidelink positioning method of the first device and a parameter for transmitting the at least one PRS based on the information related to the capability of the second device.

9. The method of claim 8, further comprising:
determining assistance data based on the information related to the capability of the second device; and
transmitting, to the plurality of second devices, at least one sidelink positioning protocol message including the assistance data,
wherein the at least one sidelink positioning protocol message represents the sidelink positioning method by a transaction ID,
wherein the assistance data is divided and transmitted to the plurality of second devices, and
wherein a last transmitted sidelink positioning protocol message includes information related to an end for the transaction ID.

10. The method of claim 9, wherein the at least one PRS is transmitted to the plurality of second devices based on the assistance data.

11. The method of claim 2, wherein the message requesting the sidelink positioning includes priority information of a service related to the first device, and
wherein the plurality of second devices include a second device in which a priority of a service related to the second device is lower than a priority of a service related to the first device.

12. The method of claim 1, wherein the at least one PRS is transmitted through any one of at least one S-SSB, at least one PSCCH or at least one PS SCH.

13. The method of claim 1, wherein the location of the first device is determined based on the location information of the second device and at least one of a difference between the TOA values of the plurality of second devices or a sum of the TOA values of the plurality of second devices.

14. A first device for performing wireless communication, the first device comprising:
one or more memories storing instructions;
one or more transceivers; and
one or more processors connected to the one or more memories and the one or more transceivers, wherein the one or more processors execute the instructions to:
transmit, to a plurality of second devices, at least one positioning reference signal (PRS);
receive, from the plurality of second devices, location information of the plurality of second devices and time of arrival (TOA) values of the plurality of second devices; and
determine a location of the first device based on the location information of the plurality of second devices and the TOA values of the plurality of second devices,
wherein the TOA values are determined based on the time when the plurality of second devices received the at least one PRS.

15. A device configured to control a first user equipment (UE), the device comprising:
one or more processors; and
one or more memories being operably connectable to the one or more processors and storing instructions, wherein the one or more processors execute the instructions to:
transmit, to a plurality of second UEs, at least one positioning reference signal (PRS);
receive, from the plurality of second UEs, location information of the plurality of second devices and time of arrival (TOA) values of the plurality of second UEs; and
determine a location of the first device based on the location information of the plurality of second UEs and the TOA values of the plurality of second UEs,
wherein the TOA values are determined based on the time when the plurality of second UEs received the at least one PRS.

* * * * *